United States Patent
Greim et al.

(10) Patent No.: US 6,456,628 B1
(45) Date of Patent: Sep. 24, 2002

(54) DSP INTERCOMMUNICATION NETWORK

(75) Inventors: Michael C. Greim, Garland; James R. Bartlett, Plano, both of TX (US)

(73) Assignee: Intelect Communications, Inc., Richardson, TX (US)

( * ) Notice: Subject to any disclaimer, the term of this patent is extended or adjusted under 35 U.S.C. 154(b) by 0 days.

(21) Appl. No.: 09/118,176

(22) Filed: Jul. 17, 1998

Related U.S. Application Data

(63) Continuation-in-part of application No. 09/062,146, filed on Apr. 17, 1998, which is a continuation-in-part of application No. 09/062,025, filed on Apr. 17, 1998, now Pat. No. 6,163,829, which is a continuation-in-part of application No. 09/062,030, filed on Apr. 17, 1998, now Pat. No. 6,393,530.

(51) Int. Cl.⁷ .................................................. H04J 3/16
(52) U.S. Cl. ..................................................... 370/466
(58) Field of Search ................................. 370/466, 464, 370/389, 467, 394, 400, 412, 259, 312, 360, 465, 428; 604/67; 379/34, 101.01; 709/200, 222; 713/401, 502; 705/405; 348/14.07; 345/302; 707/103 R; 711/5, 147, 203, 206; 717/2, 5; 395/550, 800; 364/200

(56) References Cited

U.S. PATENT DOCUMENTS

| | | | |
|---|---|---|---|
| 3,665,404 A | | 5/1972 | Werner ..................... 340/172.5 |
| 4,449,182 A | * | 5/1984 | Rubinson et al. ........... 364/200 |
| 4,868,738 A | * | 9/1989 | Kish et al. .................. 364/200 |
| 5,083,261 A | | 1/1992 | Wilkie ......................... 395/725 |
| 5,146,607 A | * | 9/1992 | Sood et al. ................. 395/800 |
| 5,235,595 A | * | 8/1993 | O'Dowd ..................... 370/94.1 |
| 5,392,278 A | * | 2/1995 | Teel et al. ................... 370/312 |
| 5,446,910 A | | 8/1995 | Kennedy et al. ............ 395/800 |
| 5,475,858 A | * | 12/1995 | Gupta et al. ................ 395/800 |
| 5,511,200 A | | 4/1996 | Jayakumar .................. 395/739 |
| 5,557,783 A | * | 9/1996 | Oktay etal. ................. 395/550 |
| 5,584,004 A | | 12/1996 | Aimoto etal. ............... 395/405 |
| 5,659,759 A | | 8/1997 | Yamada ....................... 395/738 |
| 5,721,855 A | | 2/1998 | Hinton et al. ............... 395/394 |
| 5,867,687 A | | 2/1999 | Simpson ..................... 395/737 |
| 5,887,138 A | | 3/1999 | Hagersten et al. ...... 395/200.45 |
| 5,892,766 A | * | 4/1999 | Wicki et al. ................. 370/412 |
| 5,897,664 A | * | 4/1999 | Nesheim etal. ............. 711/206 |
| 5,911,149 A | * | 6/1999 | Luan et al. .................. 711/147 |
| 5,928,343 A | * | 7/1999 | Farmwald et al. .......... 710/104 |
| 5,966,731 A | * | 10/1999 | Barth et al. ................. 711/167 |
| 5,968,150 A | * | 10/1999 | Kametani ................... 710/100 |
| 5,987,581 A | | 11/1999 | Nale ........................... 711/202 |
| 6,047,002 A | * | 4/2000 | Hartmann et al. .......... 370/466 |
| 6,122,688 A | * | 9/2000 | Barth etal. .................. 710/100 |
| 6,163,829 A | * | 12/2000 | Greim et al. ............... 710/260 |

* cited by examiner

*Primary Examiner*—Dang Ton
(74) *Attorney, Agent, or Firm*—Howison, Thoma & Arnott, L.L.P.

(57) ABSTRACT

A multi-processor system includes a global bus (14) with a global address space and a plurality of processor nodes (10). Each of the processor nodes (10) has a CPU (20) interfaced with a local bus having a local address space. A dual port SRAM (DPSRAM) (34) is provided for interfacing between the global bus (14) and the local bus (30). Each DPSRAM (34) for each processor core (10) has a defined address space within the global bus address space. Whenever any of the global resource writes to the particular processor node (10), it is only necessary to address the designated DPSRAM (34) and transfer data thereto. The act of transferring the data thereto will generate an interrupt to the associated CPU (20) which will then cause it to read the received data on the local bus by addressing its associated DPSRAM (34). This results in only a single access cycle for data transfer. Each of the CPU's (20) can communicate directly with another of the CPU's (20) through an interprocessor communication network. This network includes a Bi-FIFO (38). The CPU (20) is operable to interface with a predefined type of memory having a defined memory access protocol different from that of the Bi-FIFO (38). Therefore, a translator circuit is required to convert memory access commands and data flow to a compatible format with that of Bi-FIFO (38). This includes a programmable bi-directional pipeline circuit (600) and also a predecode circuit (618) to allow selection of one of a plurality of Bi-FIFOs to allow the CPU (20) to communicate with different Bi-FIFOs within the same memory space.

24 Claims, 13 Drawing Sheets

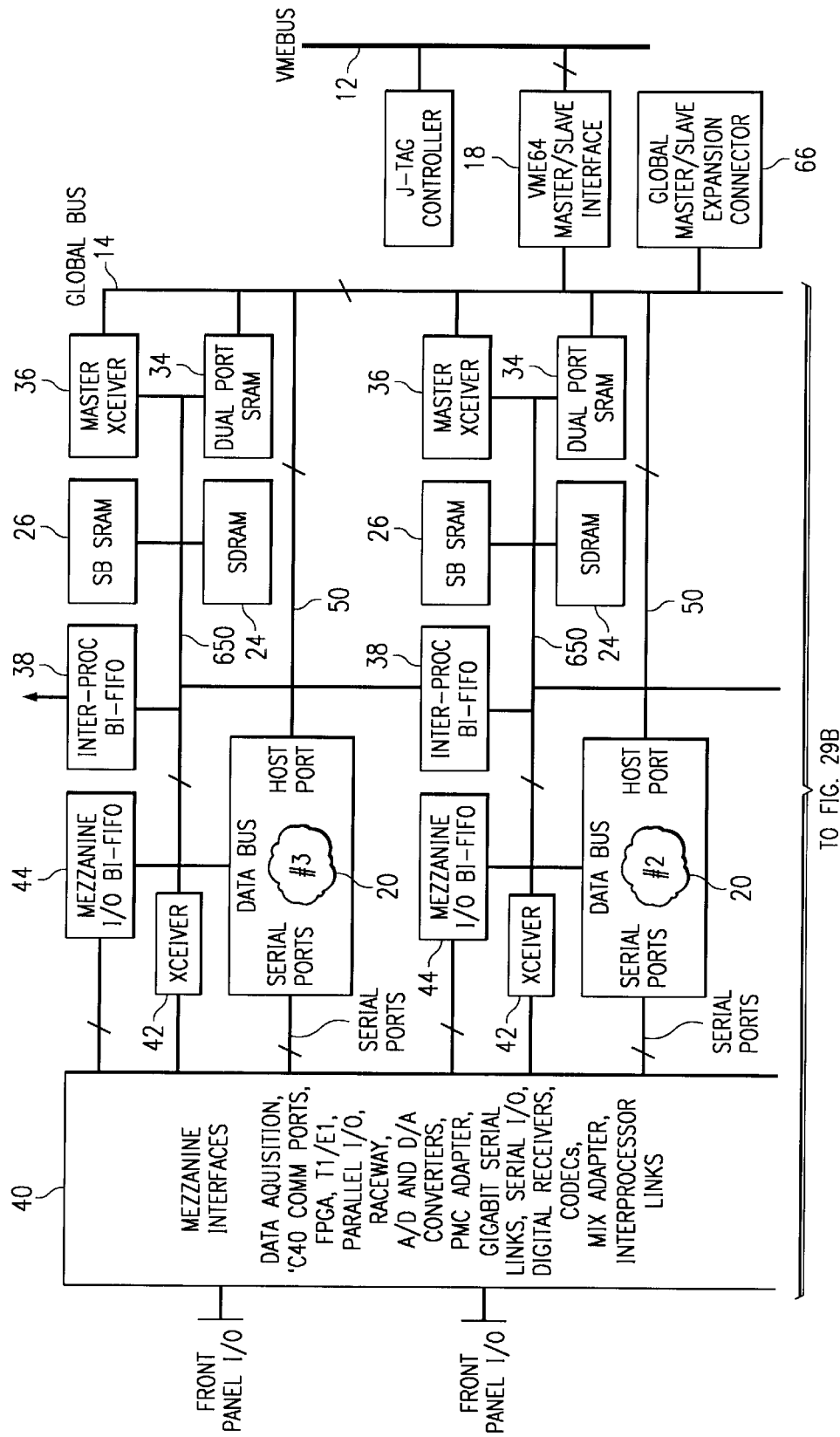

DSP INTERCOMMUNICATION NETWORK

CROSS REFERENCE TO RELATED APPLICATION

This application is a continuation-in-part application of co-pending U.S. patent application Ser. No. 09/062,146, filed Apr. 17, 1998 entitled, "DSP WITH DISTRIBUTED RAM" U.S. patent application Ser. No. 09/062,025, filed Apr. 17, 1998 entitled "DSP INTERRUPT CONTROL" now U.S. Pat. No. 6,163,829, and U.S. patent application No. 09/062,030, filed Apr. 17, 1998 now U.S. Pat No. 6,393,530 entitled "PAGING METHOD FOR DSP".

TECHNICAL FIELD OF THE INVENTION

The present invention pertains in general to a multiple processor system and, more particularly, to the intercommunication network between separate processors in the multiple processor system.

BACKGROUND OF THE INVENTION

In order to increase the processing capability of any system, multiple processor arrays have been utilized. Typically, these multiple processor arrays are comprised of independent central processing units (CPUs) which are disposed.in an array with each having a local bus with local peripheral units disposed thereabout. The local buses of each of the CPUs is then interfaced with a global bus. In turn, the global bus is interfaced with a system bus. One type of system bus is a VME bus.

When handling data flow between the system bus and each of the CPUs in the array of processors, traffic must be routed over the global bus. In order for information to be transmitted: either from the processors to the system bus or from the system bus to the processors, there must be some type of arbitration. Typically, a bus request is sent out to the global bus control system and then the bus request granted to that requesting device. Data can then be transmitted over the bus in the appropriate manner. This is a conventional operation. However, the global bus becomes the limiting factor in transfer of data between processors and the system bus, and even between adjacent processors on the global bus. This is due to the fact that only one device can occupy the global bus at a given time.

One type of CPU that has been used widely is a Digital Signal Processor (DSP). These processors execute instructions at a very high rate but, unfortunately, like most processors, the architecture of the processor will determine the limitations of that processor with respect to communicating with the global bus, communicating with other processors and handling interrupts. Typically, most DSPs are designed for single chip use and must be provided with another layer of infrastructure in order to be incorporated into an array of microprocessors.

One difficulty in dealing with a multiple processor array is that of handling interrupts between the System Bus and the array of processors. This is due to the fact that a device on the System Bus side of the global bus sends out an interrupt in a normal matter which must then be transmitted to one or more of the processors in the array to be serviced. This requires the global bus to be occupied for the interrupt period in order for anyone of the processors to, first, recognize the interrupt and, second, to then service the interrupt. This is difficult when dealing with multiple processors in that some scheme must be developed in order to define which of the processors is to service the interrupt. This can be difficult if an interrupt is to be serviced by more than one processor.

SUMMARY OF THE INVENTION

The present invention disclosed and claimed herein comprises interprocessor communication device for communicating between first and second processors. Each of the first and second processors has a communication protocol associated therewith for transmitting data thereto and receiving data therefrom. An interprocessor buffer is provided for storing data, the buffer having a first communication port and a second communication port for communicating therewith in a third buffer protocol. Data can be transmitted into one of the first or second ports for storage in the buffer and retrieved from the other of the first and second ports for access of data from the buffer. A first translator is operable to convert the communication protocol of the first processor to the buffer communication protocol, and is disposed between the first processor and the first port of the buffer for allowing the first processor to communicate with the first port of the buffer in the associated communication protocol of the first processor. A second translator is provided for converting the communication protocol of the second processor to the buffer communication protocol and is disposed between the second processor and the second port of the buffer for allowing the second communication processor to communicate with the second port of the buffer in the associated communication protocol of the second processor.

In another aspect of the present invention, the communication protocols of the first and second processors each comprises a memory access protocol for accessing a predetermined type of memory which has a predetermined access protocol. The first and second translators are operable to translate the memory access protocol associated with the first and second processors to the buffer communication protocol, such that communicating with the buffer by either of the first or second processors is effected by the first and second processors with the memory access protocol.

In a further aspect of the present invention, a notification device is provided for notifying the one of the first and second processors to which data is being transmitted through the interprocessor buffer, such that data designated therefore is stored in the interprocessor buffer. The interprocessor buffer stores the data until retrieved by the receiving one of the first and second processors.

BRIEF DESCRIPTION OF THE DRAWINGS

For a more complete understanding of the present invention and the advantages thereof, reference is now made to the following description taken in conjunction with the accompanying Drawings in which:

FIGS. 29A–29B illustrate a detailed diagram of a processor block with four processor boards interconnected with the Bi-FIFO;

DETAILED DESCRIPTION OF THE INVENTION

Figure 1:
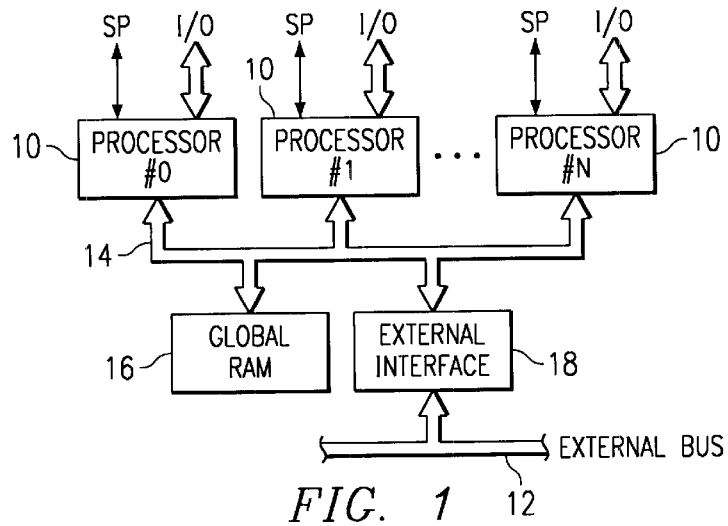
FIG. 1 illustrates an overall block diagram of a multi-processor system.

Referring now to FIG. 1, there is illustrated a block diagram of a processing system for interfacing between one of N processor cores 10 and an External Bus 12. The processor cores 10 are coupled to a global bus 14, which global bus has associated therewith some type of global memory 16. The External Bus 12 is interfaced to the global bus 14 through an External Interface 18. In the preferred embodiment, the External Bus 12 is a Versatile Planar Bus (VME) which is a conventional bus described in "IEEE Standard for a Versatile Planar Bus; VMEbus STD 1014-1987", which is an IEEE standard for this bus. The External Interface 18 for the VME Bus is provided by typical chipset, one of which is termed the VIC64 part manufactured by Cypress Semiconductor.

As will described herein below, each of the processor cores 10 contains an internal Central Processing Unit (CPU) coupled to private memory and to I/O resources. Each of the CPUs has access to four types of I/O resources: a 32-bit; Bi-FIFO coupled, daughterboard expansion port supporting up to four hundred MB/s of I/O; a 32-bit control interface allowing the CPU random access to daughterboard resources; full MCBSP connectivity to the daughterboard; and global bus expansion through a dual port memory structure. The global bus 14, by comparison, contains shared resources, such as the global RAM 16, that are accessible from the External Bus 12 side or the processor cores 10.
Processing Node Referring now to FIG. 2 there is illustrated a more detailed block diagram of the system of FIG. 1 illustrating in more detail one of the processor cores 10, this being labeled "Processor #0", there being additional processor cores 10 associated therewith. At the heart of the processor core 10 is a CPU 20 which comprises a 200 MHZ 320 c 6201 processor, manufactured by Texas Instruments. The CPU 20 is interfaced with a local bus 22, local bus 22 having memory interfaced therewith. The memory comprises synchronous memory in the form of a synchronous DRAM (SDRAM) 24 and synchronous burst SRAM (SBSRAM) 26. The SDRAM 24 is a 16 MB memory configured as 4 M×32, with the SBSRAM 26 being 512 KB configured as 128 K×32. The local bus 22 is connected to an intermediate bus 30 through a bi-directional buffer 32 which has associated therewith a dual port SRAM (DPSRAM) 34 associated therewith, the bus 30 is input to one port of the DPSRAM 34, the other port thereof interfaced with the global bus 14. A bidirectional buffer 36 is connected between the bus 30 and the global bus 14. The intermediate bus 30 is also interfaced with an interprocessor bi-directional FIFO (Bi-FIFO 38) and also connected to an I/O expansion port 40 through a bidirectional buffer 42. The buffer 42 is designed to handle control transfers. With respect to communication with various peripheral devices, an I/O bi-directional FIFO (Bi-FIFO) 44 is provided which is disposed between the bus 30 and the I/O expansion port 40. There is also a register 46 provided for interface with the bus 30. The CPU 20 can also interface directly with the global bus 14 through a host port (H) through a bus 50 and a bi-directional buffer 52. The CPU 20 is also able to interface with a serial port 48 through a bi-directional serial buffer 54.

The global bus 14 includes global resources in the form of a flash memory 60, a non-volatile RAM (NVRAM) 62 and static RAM (SRAM)64. The system will boot from the flash memory 60 which is an 8 MB global bus resident flash memory 60 with the SRAM 64 being 2 MB in size. The two provide a shared memory space for data transfers. A global bus slave 66 provides I/O expansion support. The system bus 12 is interfaced with global bus 14, as described hereinabove, through the VME interface 18, which VME interface 18 is of the type VIC64, manufactured by Cypress Semiconductor, the operation of which is described in the "VIC068/VAC068A User's Guide" which is published by Cypress Semiconductor, and which is incorporated here in my reference. The system bus 12 is also interfaced with the various expansion devices as indicated by block 68.

The CPU 20 utilizes the SBSRAM 26 as the processor core's zero wait state memory resource. After an initial time penalty to prime the pipe of the device, random accesses can occur to the memory structure at one transfer per clock yielding a throughput of 800 MB/s. The DPSRAM 34 functions as the data pipe for the processor core I/O, allowing data to pass in or out of the processor core I/O without the need for arbitration on the global bus 14 or the double accesses associated with a shared memory structure (i.e. VME transfers data into global RAM 16, and the CPU 20 transfers the data from the global RAM 16 into the core, halving global bus throughput), this being described in more detail hereinbelow. With this memory structure, the CPU 20 can continue to execute instructions while a VME master loads or retrieves data from the memory structure.

The processor core 10 is provided with two ports through which data can be passed to or from the outside world. The first is through the I/O expansion port 40 and the other is the master/slave global bus gateway interface utilizing the DPSRAM 34. Both of these interfaces are designed to provide a high throughput datapipe structure that allows the CPU 20 to continue operating while data is loaded to or removed from the core, while additionally providing a random access interface for control functions. The I/O expansion port 40 provides the interface through the Bi-FIFO 44 to facilitate a high throughput streaming data interface, address, data, control, interrupts and both MCBSPs from the CPU 20. The streaming interface provided by the Bi-FIFO 44 with associated logic allows access to be performed at a 100 MHz rate, yielding a transfer rate up to 400 MB/s. The Bi-FIFO 44 additionally provides a mailbox function between the mother and daughter board, the daughter board being connected to the I/O expansion port 40. In connecting the I/O expansion port 40 in a direct point-to-point to the Bi-FIFO minimizes signal integrity issues. The global bus gateway provides a mechanism allowing the CPU 20 direct access to global resources and the VME transfers, while offering a streaming data path via DPSRAM 34. The DPSRAM 34 allows block transfer data to be directly transferred into a processor core 10 while the CPU 20 continues to execute instructions and eliminates the double accesses associated with a traditional shared global memory structure.

In one embodiment, the CPU 20 is capable of executing eight instructions in parallel and can produce 1600 MIPs/400 MMACs at 200 MHz. The CPU 20 offers an extensive set of memory and peripheral resources including one Mbit of on-chip SRAM, a 16-bit host port, to T1/E1 compatible Multi-channel Buffered Serial Ports (McBSP), a 4-channel bootable DMA, 2-general purpose timers and an advanced memory interface capable of directly interfacing to the SDRAM 24, the SBSRAM 26.

The SDRAM is a synchronous DRAM which is 16 MB in size configured as 4 M×32 to provide a large storage resource capable of providing a peak data throughput of 400 MB/s. Unlike the SBSRAM 26 that can provide continuous random access at 800 MB/s, the user must exercise care in utilizing the SDRAM 24 as there is a non-trivial 60 nS row access penalty whenever a page boundary is crossed. However after the row access penalty, all subsequent accesses within the same page will require only two clocks offering 400 MB/s of throughput with 32-bit transfers. The SDRAM 24 is accessed through the 16 Mbyte CE2 memory window of the CPU 20.

In order for the array to allow communication between various processor cores 10, each processor core 10 is able to efficiently exchange blocks of data with other processor cores 10. The Bi-FIFO 30 is provided that is a switched bank FIFO scheme that allows interprocessor communication to occur of up to 400 MB/s per path along with an ability to exercise multiple paths concurrently. Additionally, this scheme passes directly between the CPUs 20 eliminating the delays associated with arbitration and traffic for a traditional global bus based scheme. A programmable flag is provided which allows users to specify their relevant block size and whether they will be interrupted or poll to determine transfer status. This scheme is linearly scalable supporting a peak interprocessor transfer rate of 3.2 GB/s in a complex of eight CPUs 20.

The DPSRAM 34 is a 256 KB memory, configured at 64 K×32, to provide an interface between processor core #0 and the VME bus 12. Not only does the DPSRAM 34 provide a high throughput memory device that minimizes global bus traffic, but the DPSRAM 34 additionally provides for eight mailbox resources (four each direction) between the CPU 20 and the global bus 14. Since the memory block is dual ported between the processor core 10 and the global bus 14, a single access is all that is required to transfer a word of data between the VME bus 12 and each processor core 10. This offers a greater than 100% performance improvement over traditional global shared memory architectures that required data to be transferred to the global resident SRAM, another arbitration cycle performed, and then transferred out of the global memory. This not only requires twice the time, but ties up the global bus 14 for other CPUs 20 and interprocessor communication. Secondly, due to the larger depth of the DPSRAM 34 utilized, the distributed structure significantly increases the size of the available global memory. As this is a switched bank architecture, there may need to be an arbitration cycle to obtain the structure prior to access. The mailboxes offer an efficient means to transfer messages between the VME bus 12 and each processor core 10.

The processor expansion port 40 provides a high throughput streaming data interface with a FIFO scheme, described hereinabove, that allows blocks of data to pass between the motherboard and the daughterboard at up to 400 MB/s. A 2×1K×32 Bi-FIFO operating at 100 MHz acts as the interface between the daughterboard connector and the intermediate bus 30 of the processor core 10. The daughterboard will have access to all of the necessary control and flags for the Bi-FIFO 44. This interface also provides a microprocessor style interface allowing interface to buffered versions of the intermediate bus 30 signals. The daughterboard has access to sixteen bits of address, thirty two bits of data, transfer control signals, an interrupt and a clock synchronized to the processor 20. This interface is accessed via the CPU 20 memory space and is visible regardless of the contents of a global paging register (described hereinbelow).

CPU Addressing Overview

The CPU 20 has four memory windows with up to 52 MBytes of addressable space for resources outside the CPU 20. However, this amount of memory is only possible if three of the windows contain a multiplexed address resource, this being the SDRAM 24. The entire multiple-processor system contains only one such window, and, therefore, the maximum total amount of external memory available through direct addressing is 28 MBytes. Each of these windows is dedicated to a specific memory type, with the three choices being: synchronous DRAM (SDRAM) 24, synchronous burst SRAM (SBSRAM) 26 and asynchronous memory. The memory type and data width are fixed at boot time, based on the state of certain inputs to the CPU 20. The following table 1.0 illustrates the programming of these windows for the multiple-processor system.

TABLE 1.0

Memory Window Setup for the CPU 20

| Window | Type | Port Size | Avail Space | Resource Space | Resource |
|---|---|---|---|---|---|
| CE3 Space | SBSRAM | 32 Bits | 4 M | 512 KB | SBSRAM |
| CE2 Space | SDRAM | 32 Bits | 16 M | 16 MB | SDRAM |
| CE1 Space | Async* | 32 Bits | 4 M | TBD | FIFO Gateway |
| CE0 Space | Async | 32 Bits | 4 M | 4 M | Global Bus Private Regs Private I/O |

*Note, this is a programmable memory space at the board level and may be programmed to either SBSRAM or Async depending on system level requirements of the overall structure.

The multi-processor architecture employs a hybrid addressing scheme that allows users to trade off the highest possible performance in favor of ease of programming. The CE3 and CE2 memory windows are not affected by this hybrid scheme as the CPU 20 is a direct connect to the memory resources. The CE1 memory window is the less complicated of the remaining two windows, as the memory space may have either SBSRAM or Async timing, and a Switch-Bank (SB) architecture is employed. The trade off considerations for selecting the interface's timing as well as a detailed description of the operation of the CE1 address space is described hereinbelow with respect to the inter-processor communications. The Switch-Bank architecture is employed to assure optimal performance of the inter-processor/VME bus FIFO paths. As the timing of the SBSRAM 26 does not afford logic an adequate amount of time to perform an address decode on the fly, a pre-decode is performed through the programming of the processor core control register (described hereinbelow). Bits 15 and 16 of the miscellaneous control register control which FIFO block is logically connected to the CPU 20. In SBSRAM 26, this structure allows each of the FIFOs to operate at a peak throughput of 400 MB/s. As a decode in the Async space would also force a wait state access, the SB architecture is also useful with this timing.

The CPU 20 offers only an address space of 4 MB (max) in its asynchronous window (CE0). To accommodate for this, a paging scheme is employed to allow the addressing of over 2 Gbytes of address space necessary for the CPU 20 to address all of the system's resources and the VME bus 18, as will be described hereinbelow. Additionally, since some resources, including private registers associated with the CPU 20, the local side of the CPU 20 DPSRAM 34, and the random access daughterboard interface need to be accessible at all times, this local address space is divided into two sections, a local section and a global section. This allows global accesses to exist in the lower 2 MB and private resources associated therewith to exist in the upper 2 MB. This is determined by the address A21 being set equal to "0" for the global access and being set equal "1" for the local access. This division facilitates an extremely quick and simple decode. At reset, the paging register is set to "0000" such that the CPU 20 will automatically point at the flash memory 60 for booting. The CE0 address map is illustrated in FIG. 3.

Figure 3:
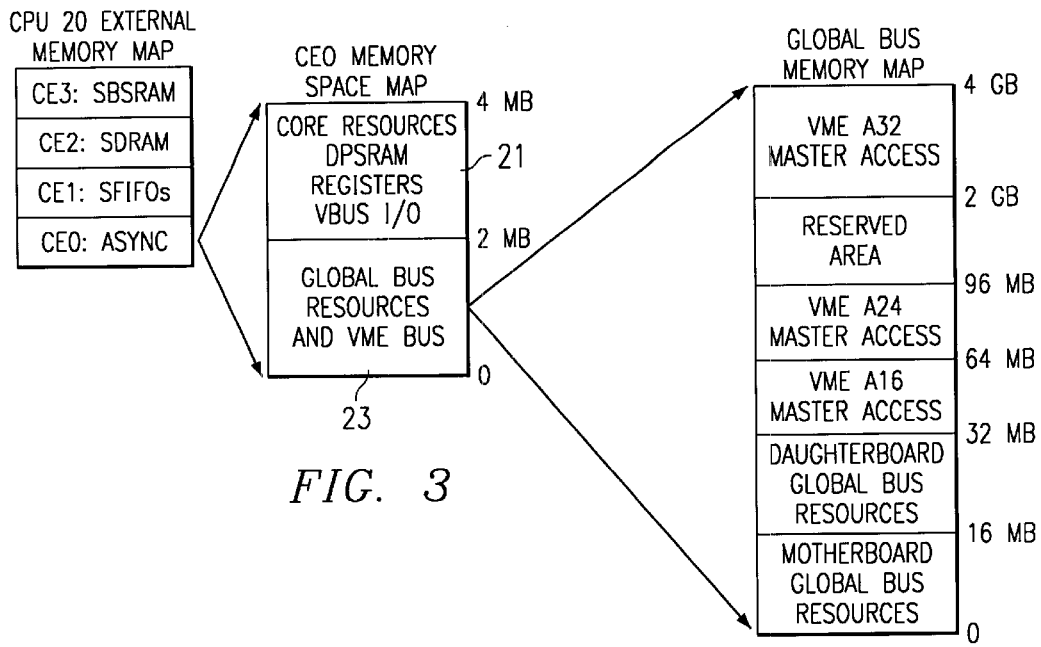
FIG. 3 illustrates a memory map for the paging scheme.

With reference to FIG. 3, the CPU 20 external memory illustrating how the CE0 is provided with two sections, an upper section 21 and a lower section 23. This constitutes the space that is addressable from the CPU 20, i.e., this address space residing directly in the address space of the CPU 20.

The lower section 23 provides access to the global resources and the VME bus 18. The paging scheme allows the lower 2 MB section 23 to be mapped into the global bus memory map, which is illustrated as having 4 GBytes of addressable space which has a portion thereof associated with the VME A32 master access space, the VME A24 master access space, the VME A16 master access space, the daughterboard global bus resources and the motherboard global resources.

For each CPU 20, there is provided a private 16-bit paging register. This paging register is provided for in the FPGA. The upper twelve and lower two bits of the paging register contain the paging field with the remaining two bits reserved. The paging field is combined with the CPU 20 buffered address to form the 32-bit global bus address. The top bit of the paging register (bit 11) determines whether the CPU 20 is performing a VME access or not. If this bit is set, a VME access is performed, and the remaining three bits of the paging register are combined with the CPU 20 address that is enabled on the global bus 23 and presented to the VME. This allows the CPU 20 to have full access to the VME A32 address.

After a CPU 20 has been granted the global bus 23, the contents of the paging register and buffered versions of the CPU 20 address and byte enables will be combined to drive the bus. The lower 21 bits of the global bus address are formed from buffered address bits 20:2 of the CPU 20 and the encoded processor byte enables. The 13 bits of the paging register drive the upper 11 bits global address, 31:21, and the lower two, 1:0.

The local bus memory map is set forth in table 2.0, which shows the portion of the memory map that is associated with the CE0, the CE1, internal program memory and internal peripheral memory, the SDRAM (CE2), the SBSRAM (CE3) and some internal data memory. It is noted that private control registers are associated with the address range "0028 0000-002B FFFF".

TABLE 2.0

CPU 20 Local Bus Memory Map

| Address Range | Block Size | Resource | Data Width | Access Time |
|---|---|---|---|---|
| 0000 0000–001F FFFF | 2 Mbytes | Global Bus (CE0 Space) | 32 Bits | TBD |
| 0020 0000–0023 FFFF | 256 KBytes | Dual Port Sram (Local Side) (CE0 Space) | 32 Bits | 4 clk |
| 0024 0000–0027 FFFF | 256 Kbytes | DPSRAM Mailbox DP Interrupts (CE0 Space) | 32 Bits | 4 clk |
| 0028 0000–002B FFFF | 256 Kbytes | Private Control Registers (CE0 Space) | 32 Bits | 10 clk |
| 002C 0000–002F FFFF | 256 Kbytes | Reserved (CE0 Space) | N/A | N/A |
| 0030 0000–0033 FFFF | 256 KBYTES | Random Access VBus I/O (CE0 Space) | 32 Bits | 0 |
| 0034 0000–00FF FFFF | 12.75 Mbytes | Reserved (CE0 Space) | 32 Bits | 4 clk |
| 0100 0000–013F FFFF | 4 Mbytes | IP Comm FIFOs & I/O Exp FIFO (CE1 Space) | 32 Bits | 2 clk or 4 clk |
| 0140 0000–0140 FFFF | 64 Kbytes | Internal Program Memory | 32 Bits | 1 clk |
| 0141 0000–017F FFFF | 3936 KBYTES | Reserved | N/A | N/A |

TABLE 2.0-continued

CPU 20 Local Bus Memory Map

| Address Range | Block Size | Resource | Data Width | Access Time |
|---|---|---|---|---|
| 0180 0000–01FF FFFF | 4 Mbytes | Internal Peripheral Space | 32 Bits | 1 clk |
| 01C0 0000–01FF FFFF | 4 Mbytes | Reserved | N/A | N/A |
| 0200 0000–02FF FFFF | 16 MBytes | SDRAM Bank 0 (CE2 Space) | 32 Bits | 2 clk |
| 0300 0000–0307 FFFF | 0.5 Mbytes | SBSRAM Bank 1 (CE3 Space) | 32 Bits | 1 clk |
| 0308 0000–03FF FFFF | 15.5 MBytes | Reserved (CE3 Space) | 32 Bits | N/A |
| 0400 0000–7FFF FFFF | 1984 MBytes | Reserved | N/A | N/A |
| 8000 0000–8000 FFFF | 64 KBYTES | Internal Data Memory | 32 Bits | 1 clk |
| 8001 0000–FFFF FFFF | 2048 MB-64K | Reserved | N/A | N/A |

The global bus memory map, as it is viewed by the CPU 20, is viewed as a 4 GByte address space that includes all of the local resources and all of VME space for master accesses. As noted above, this space is divided up into 2 MB pages, as that is all that is available with the CPU 20 address space after assignment of the remaining space to the core private resources. This global bus memory map is illustrated in Table 3.0.

TABLE 3.0

CPU 20 View of 4 GByte Global Bus Memory Map

| Global Bus Address | Description | Block Size | # of CPU Pages |
|---|---|---|---|
| 0 0000 0000–0 007F FFFF | Flash EEPROM | 8 MBytes | 4 |
| 0 0080 0000–0 009F FFFF | Global Sram 512 K × 32 | 2 MBytes | 1 |
| 0 00A0 0000–0 00A3 FFFF | C6201 #0 DPSRAM | 256 KBYTES | 1* |
| 0 00A4 0000–0 00A7 FFFF | C6201 #1 DPSRAM | 256 KBYTES | 1* |
| 0 00A8 0000–0 00AB FFFF | C6201 #2 DPSRAM | 256 KBYTES | 1* |
| 0 00AC 0000–0 00AF FFFF | C6201 #3 DPSRAM | 256 KBYTES | 1* |
| 0 00B0 0000–0 00B3 FFFF | DPSRAM NVSram 8K × 8 | 256K Bytes | |
| 0 00B4 0000–0 00B4 FFFF | C6201 #0 Host Port | 64 Kbytes | 1* |
| 0 00B5 0000–0 00B5 FFFF | C620 #1 Host Port | 64 KBYTES | 1* |
| 0 00B6 0000–0 00B6 FFFF | C6201 #2 Host Port | 64 KBYTES | 1* |
| 0 00B7 0000–000B7 FFFF | C6201 #3 Host Port | 64 KBYTES | 1* |
| 0 00B8 0000–0 00BF FFFF | Global Registers MB DP Mailboxes MB DP Ints | 512 Kbytes | |
| 0 00C0 0000–0 00FF FFFF | Reserved*** | 4 MBytes | 2 |
| 0 0100 0000–0 01FF FFFF | DB Expansion | 16 MBytes | 8 |
| 0 0200 0000–0 02FF FFFF | VME A16 D32 Master Access | 16 MBytes | 8 |
| 0 0300 0000–0 03FF FFFF | VME A16 D16 Master Access | 16 MBytes | 8 |
| 0 0400 0000–0 04FF FFFF | VME A24 D32 Master Access | 16 MBytes | 8 |
| 0 0500 0000–0 05FF FFFF | VME A24 D16 Master Access | 16 MBytes | 8 |
| 0 0600 0000–0 FFFF FFFF | Reserved** | 2 GBYTES-96 MBytes | |
| 1 0000 0000–1 FFFF FF FFFF | VME A32 D32 Master Access | 2 Gbytes | 1K |

*These resources are all contained in the same page
**Note: these cycles are acknowledged, but write data is effectively lost and read data is non-deterministic
***Paged DB access from A24 space. This memory is best avoided in A32 from VME or processor With respect to the VME A32, A24 and A16 slave memory maps, they are viewed by the external bus, as illustrated in Tables 4.0, 5.0 and 6.0 as follows:

TABLE 4.0

VME A32 Slave Memory Map
Occupies 32 MB of 4 GB A32 Address Space

| A32 Base Address Offset | Description | Block Size | Comments |
|---|---|---|---|
| 0000 0000–007F FFFF | Flash EEPROM | 8 MBytes | D32 LWord |
| 0080 0000–009F FFFF | Global Sram 512K × 32 | 2 MBytes | A32 D32 LWord, Word, Byte A32 D16 Word,Byte A32 Block* |
| 00A0 0000–00A3 FFFF | C6201 #0 DPSRAM | 256 KBYTES | A32 D32 LWord, Word, Byte A32 D16 Word,Byte A32 Block* |
| 00A4 0000–00A7 FFFF | C6201 #0 DPSRAM Mailbox, DP Interrupt | 256 KBYTES | A32 D32 LWord, Word, Byte A32 D16 Word,Byte A32 Block* |
| 00A8 0000–00AB FFFF | C6201 #1 DPSRAM | 256 KBYTES | A32 D32 LWord, Word, Byte A32 D16 Word,Byte A32 Block* |
| 00AC 0000–00AF FFFF | C6201 #1 DPSRAM Mailbox, DP Interrupt | 256 KBYTES | A32 D32 LWord, Word, Byte A32 D16 Word,Byte A32 Block* |
| 00B0 0000–00B3 FFFF | C6201 #2 DPSRAM | 256 KBYTES | A32 D32 LWord, Word, Byte A32 D16 Word,Byte A32 Block* |
| 00B4 0000–00B7 FFFF | C6201 #2 DPSRAM Mailbox, DP Interrupt | 256 KBYTES | A32 D32 LWord, Word, Byte A32 D16 Word,Byte A32 Block* |
| 00B8 0000–00BB FFFF | C6201 #3 DPSRAM | 256 | A32 D32 LWord, Word, Byte |

TABLE 4.0-continued

VME A32 Slave Memory Map
Occupies 32 MB of 4 GB A32 Address Space

| A32 Base Address Offset | Description | Block Size | Comments |
|---|---|---|---|
| 00BC 0000–00BF FFFF | C6201 #3 DPSRAM Mailbox, DP Interrupt | KBYTES 256 KBYTES | A32 D16 Word,Byte A32 Block* A32 D32 LWord, Word, Byte A32 D16 Word,Byte A32 Block* |
| 00C0 0000–00CF FFFF | NVSram 8K × 8 | 256K Bytes | A32 D32 (MSB of data valid) |
| 00D0 0000–00DF FFFF | C6201 #0–#3 Host Port Interface Registers | 128 KBYTES | A32 D32 LWord, Word A32 D16 Word |
| 00E0 0000–00EF FFFF | Global Registers MB DP Mailboxes MB DP Ints | '512 Kbytes | A32 D32 LWord, Word A32 D16 Word |
| 00C0 0000–00FF FFFF | Reserved | 4 MBytes | N/A |
| 0100 0000–01FF FFFF | DB Expansion | 16 MBytes | A32 D32 LWord, Word, Byte A32 D16 Word,Byte A32 Block* |

*Block indicates support in D32 and D64 block transfer modes

TABLE 5.0

VME A24 Slave Memory Map
Occupies 16 MB of 16 MB A24 Address Space

| A24 Base Address Offset | Description | Block Size | Comments |
|---|---|---|---|
| 0000 0000–007F FFFF | Flash EEPROM | 8 MBytes | A24 D32 LWord |
| 0080 0000–009F FFFF | Global Sram 512K × 32 | 2 MBytes | A24 D32 LWord, Word, Byte A24 D16 Word,Byte |
| 00A0 0000–00A3 FFFF | C6201 #0 DPSRAM | 256 KBytes | A24 D32 LWord, Word, Byte A24 D16 Word,Byte |
| 00A4 0000–00A7 FFFF | C6201 #0 DPSRAM Mailbox, DP Interrupt | 256 KBytes | A24 D32 LWord, Word, Byte A24 D16 Word,Byte |
| 00A8 0000–00AB FFFF | C6201 #1 DPSRAM | 256 KBytes | A24 D32 LWord, Word, Byte A24 D16 Word,Byte |
| 00AC 0000–00AF FFFF | C6201 #1 DPSRAM Mailbox, DP Interrupt | 256 KBytes | A24 D32 LWord, Word, Byte A24 D16 Word,Byte |
| 00B0 0000–00B3 FFFF | C6201 #2 DPSRAM | 256 KBytes | A24 D32 LWord, Word, Byte A24 D16 Word,Byte |
| 00B4 0000–00B7 FFFF | C6201 #2 DPSRAM Mailbox, DP Interrupt | 256 KBytes | A24 D32 LWord, Word, Byte A24 D16 Word,Byte |
| 00B8 0000–00BB FFFF | C6201 #3 DPSRAM | 256 KBytes | A24 D32 LWord, Word, Byte A24 D16 Word,Byte |
| 00BC 0000–00BF FFFF | C6201 3 DPSRAM Mailbox, DP Interrupt | 256 KBytes | A24 D32 LWord, Word, Byte A24 D16 Word,Byte |
| 00C0 0000–00CF FFFF | NVSram 8K × 8 | 1 MBytes | A24 D32 (MSB of data valid) |
| 00D0 0000–00DF FFFF | C6201 #0–#3 Host Port Interface | 1 MBytes | A24 D32 LWord, Word A24 D16 Word |
| 00E0 0000–00EF FFFF | Global Registers | 1 Mbytes | A24 D32 LWord, Word A24 D16 Word |
| 00F0 0000–00FF FFFF | Reserved | 1 MBytes | N/A |

*Block indicates support in D32 and D64 block transfer modes

TABLE 6.0

VME A16 Slave Memory Map (VIC64/964 decoded)
Occupies 2 KB of 64 KB A16 Address Space

| A16 Base Address Offset | Description | Comments |
|---|---|---|
| 0000 0700–0000 073F | VIC64 Registers | A16 D16 |
| 0000 0740–0000 7FE | VME Mailbox Registers | A16 D16 |

Processor Private Control Register Definition

Each of the processor cores 10 has associated therewith a number of control registers. These are contained within an FPGA, which is mapped to the address locations 00280000h–002FFFFFh. The specific registers associated with each of the processor cores 10 are set forth in the memory map of Table 7.

TABLE 7.0

Processor Private Control Register Memory Map

| CPU Address | Description | Access |
|---|---|---|
| 0028 0000 | Interrupt Enable Register 0 | R/W |
| 0028 0004 | Interrupt Enable Register 1 | R/W |
| 0028 0008 | Interrupt Flag Register 0 | R/W |
| 0028 000C | Interrupt Flag Register 1 | R/W |

TABLE 7.0-continued

Processor Private Control Register Memory Map

| CPU Address | Description | Access |
|---|---|---|
| 0028 0010 | Interrupt Status Register 0 | R/W |
| 0028 0014 | Interrupt Status Register 1 | R/W |
| 0028 0018 | Miscellaneous Interrupt Register | R/W |
| 0028 001C | Miscellaneous Control Register 0 | R/W |
| 0028 0020 | Miscellaneous Control Register 1 | R/W |
| 0028 0024 | global bus Paging Register | R/W |
| 0028 0028 | global bus Semaphore Register | R/W |
| 0028 002C–0028 00FC | Reserved Area | N/A |
| 0028 0100 | VME Interrupt Gating Register | R/W |
| 0028 0104 | VME Interrupt Pending Register | RO |
| 0028 0108 | VME IPL1 Interrupt Vector Register | RO |
| 0028 010C | VME IPL2 Interrupt Vector Register | RO |
| 0028 0110 | VME IPL3 Interrupt Vector Register | RO |
| 0028 0114 | VME IPL4 Interrupt Vector Register | RO |
| 0028 0118 | VME IPL5 Interrupt Vector Register | RO |
| 0028 011C | VME IPL6 Interrupt Vector Register | RO |
| 0028 0120 | VME IPL7 Interrupt Vector Register | RO |
| 0028 0124 | IPL Interrupt Enable Register | R/W |

There are a number of interrupt registers for handling interrupts for the interprocessor communications generated by the Bi-FIFOs 38 for each of the processor cores 10. These will basically be the interrupt enable registers "0" and "1" and the interrupt flag registers "0" and "1". In addition, there are provided two interrupt status registers. The function of each of these is set forth as follows:

Interrupt Enable Register 0, IER0

This register contains the enables for the interrupt sources associated with one of the two inter-processor communication Bi-FIFOs. Each processor 20 has a unique version of this register that is presented to the processor 20 at the above address. A given processor 20 can only access its own register. The register contains the enables 30 which allow the associated flags to set the specified interrupt. If a given enable is set, a flag condition becoming active will result in the interrupt being set.

| Bit Location | | Type | Description |
|---|---|---|---|
| msb | 15 | R/W | I/P Bi-FIFO XX outgoing mailbox |
| | 14 | R/W | I/P Bi-FIFO XX incoming mailbox |
| | 13 | R/W | I/P Bi-FIFO XX outgoing side almost full |
| | 12 | R/W | I/P Bi-FIFO XX outgoing side almost empty |
| | 11 | R/W | I/P Bi-FIFO XX outgoing side empty |
| | 10 | R/W | I/P Bi-FIFO XX incoming side almost full |
| | 09 | R/W | I/P Bi-FIFO XX incoming side almost empty |
| | 08 | R/W | I/P Bi-FIFO XX incoming side empty |
| | 07 | R/W | Reserved |
| | 06 | R/W | Reserved |
| | 05 | R/W | Reserved |
| | 04 | R/W | Reserved |
| | 03 | R/W | Reserved |
| | 02 | R/W | Reserved |
| | 01 | R/W | Reserved |
| | 00 | R/W | Reserved |

Interrupt Enable Register 1, IER1

This register contains the enable bits for the interrupt sources associated with second of the two inter-processor communication Bi-FIFOs and the processor private expansion I/O Bi-FIFOs. Each processor 20 has a unique version of this register that is presented to the processor 20 at the above address. A given processor 20 can only access its own register. The register contains the enables which allow the associated flags to set the specified interrupt. If the associated enable is set, a flag condition becoming active will result in the interrupt being set.

| Bit Location | | Type | Description |
|---|---|---|---|
| msb | 15 | R/W | I/P Bi-FIFO ZZ outgoing mailbox |
| | 14 | R/W | I/P Bi-FIFO ZZ incoming mailbox |
| | 13 | R/W | I/P Bi-FIFO ZZ outgoing side almost full |
| | 12 | R/W | I/P Bi-FIFO ZZ outgoing side almost empty |
| | 11 | R/W | I/P Bi-FIFO ZZ outgoing side empty |
| | 10 | R/W | I/P Bi-FIFO ZZ incoming side almost full |
| | 09 | R/W | I/P Bi-FIFO ZZ incoming side almost empty |
| | 08 | R/W | I/P Bi-FIFO ZZ incoming side empty |
| | 07 | R/W | EXPANSION I/O Bi-FIFO outgoing mailbox |
| | 06 | R/W | EXPANSION I/O Bi-FIFO incoming mailbox |
| | 05 | R/W | EXPANSION I/O Bi-FIFO outgoing side almost full |
| | 04 | R/W | EXPANSION I/O Bi-FIFO outgoing side almost empty |
| | 03 | R/W | EXPANSION I/O Bi-FIFO outgoing side empty |
| | 02 | R/W | EXPANSION I/O Bi-FIFO incoming side almost full |
| | 01 | R/W | EXPANSION I/O Bi-FIFO incoming side almost empty |
| | 00 | R/W | EXPANSION I/O Bi-FIFO incoming side empty |

Interrupt Flag Register 0, IFR0

This register contains the flag bits for the interrupt sources associated with the first of the two inter-processor communication Bi-FIFOs. Each processor 20 has a unique version of this register that is presented to the processor 20 at the above address. A given processor 20 can only access its own register. The flag bit is a latched version of the status bit that becomes set when an individual status bit makes a transition from inactive to active. A flag bit will remain set until it is cleared by writing a 0 to the specific bit position. Note: A flag can not be directly set by writing a 1 to a specific register bit position.

| Bit Location | | Type | Description |
|---|---|---|---|
| msb | 15 | R/WC | I/P Bi-FIFO XX outgoing mailbox |
| | 14 | R/WC | I/P Bi-FIFO XX incoming mailbox |
| | 13 | R/WC | I/P Bi-FIFO XX outgoing side almost full |
| | 12 | R/WC | I/P Bi-FIFO XX outgoing side almost empty |
| | 11 | R/WC | I/P Bi-FIFO XX outgoing side empty |
| | 10 | R/WC | I/P Bi-FIFO XX incoming side almost full |
| | 09 | R/WC | I/P Bi-FIFO XX incoming side almost empty |
| | 08 | R/WC | I/P Bi-FIFO XX incoming side empty |
| | 07–00 | R/W | Reserved |

Interrupt Flag Register 1, IFR1

This register contains the flag bits for the interrupt sources associated with second of the two inter-processor communication Bi-FIFOs and the processor private expansion I/O Bi-FIFOs. Each processor 20 has a unique version of this register that is presented to the processor 20 at the above address. A given processor 20 can only access its own register. The flag bit is a latched version of the status bit that becomes set when an individual status bit makes a transition from inactive to active. A flag bit will remain set until it is cleared by writing a 0 to the specific bit position. Note: A flag can not be directly set by writing a 1 to a specific register bit position.

| Bit Location | | Type | Description |
| --- | --- | --- | --- |
| msb | 15 | R/W | I/P Bi-FIFO ZZ outgoing mailbox |
| | 14 | R/W | I/P Bi-FIFO ZZ incoming mailbox |
| | 13 | R/W | I/P Bi-FIFO ZZ outgoing side almost full |
| | 12 | R/W | I/P Bi-FIFO ZZ outgoing side almost empty |
| | 11 | R/W | I/P Bi-FIFO ZZ outgoing side empty |
| | 10 | R/W | I/P Bi-FIFO ZZ incoming side almost full |
| | 09 | R/W | I/P Bi-FIFO ZZ incoming side almost empty |
| | 08 | R/W | I/P Bi-FIFO ZZ incoming side empty |
| | 07 | R/W | EXPANSION I/O Bi-FIFO outgoing mailbox |
| | 06 | R/W | EXPANSION I/O Bi-FIFO incoming mailbox |
| | 05 | R/W | EXPANSION I/O Bi-FIFO outgoing side almost full |
| | 04 | R/W | EXPANSION IIO Bi-FIFO outgoing side almost empty |
| | 03 | R/W | EXPANSION I/O Bi-FIFO outgoing side empty |
| | 02 | R/W | EXPANSION I/O Bi-FIFO incoming side almost full |
| | 01 | R/W | EXPANSION I/O Bi-FIFO incoming side almost empty |
| | 00 | R/W | EXPANSION I/O Bi-FIFO incoming side empty |

Interrupt Status Register 0, ISR0

This register contains the status bits for the interrupt sources associated with the first of the two inter-processor communication Bi-FIFOs. Each processor 20 has a unique version of this register that is presented to the processor 20 at the above address. A given processor 20 can only access its own register. The status bit is a buffered version of the interrupting source and may be monitored by software to verify that an interrupting condition has been properly cleared.

| Bit Location | | Type | Description |
| --- | --- | --- | --- |
| msb | 15 | R/WC | I/P Bi-FIFO XX outgoing mailbox |
| | 14 | R/WC | I/P Bi-FIFO XX incoming mailbox |
| | 13 | R/WC | I/P Bi-FIFO XX outgoing side almost full |
| | 12 | R/WC | I/P Bi-FIFO XX outgoing side almost empty |
| | 11 | R/WC | I/P Bi-FIFO XX outgoing side empty |
| | 10 | R/WC | I/P Bi-FIFO XX incoming side almost full |
| | 09 | R/WC | I/P Bi-FIFO XX incoming side almost empty |
| | 08 | R/WC | I/P Bi-FIFO Xx incoming side empty |
| | 07–00 | R/W | Reserved |

Interrupt Status Register 1, ISR1

This register contains the status bits for the interrupt sources associated with second of the two inter-processor communication Bi-FIFOs and the processor private expansion I/O Bi-FIFOs. Each processor 20 has a unique version of this register that is presented to the processor 20 at the above address. A given processor 20 can only access its own register. The status bit is a buffered version of the interrupting source and may be monitored by software to verify that an interrupting condition has been properly cleared.

| Bit Location | | Type | Description |
| --- | --- | --- | --- |
| msb | 15 | R/W | I/P Bi-FIFO ZZ outgoing mailbox |
| | 14 | R/W | I/P Bi-FIFO ZZ incoming mailbox |
| | 13 | R/W | I/P Bi-FIFO ZZ outgoing side almost full |
| | 12 | R/W | I/P Bi-FIFO ZZ outgoing side almost empty |
| | 11 | R/W | I/P Bi-FIFO ZZ outgoing side empty |
| | 10 | R/W | I/P Bi-FIFO ZZ incoming side almost full |
| | 09 | R/W | I/P Bi-FIFO ZZ incoming side almost empty |
| | 08 | R/W | I/P Bi-FIFO ZZ incoming side empty |
| | 07 | R/W | EXPANSION I/O Bi-FIFO outgoing mailbox |
| | 06 | R/W | EXPANSION I/O Bi-FIFO incoming mailbox |
| | 05 | R/W | EXPANSION I/O Bi-FIFO outgoing side almost full |
| | 04 | R/W | EXPANSION I/O Bi-FIFO outgoing side almost empty |
| | 03 | R/W | EXPANSION I/O Bi-FIFO outgoing side empty |
| | 02 | R/W | EXPANSION I/O Bi-FIFO incoming side almost full |
| | 01 | R/W | EXPANSION I/O Bi-FIFO incoming side almost empty |
| | 00 | R/W | EXPANSION I/O Bi-FIFO incoming side empty |

RO: Read Only
R/W: Read Write Access, Reset = Low
R/WC: Read/Write high to clear. Sets on falling edge of flag
Note: Depending on the processor number, ZZ will represent a different inter-processor connection path. The following table illustrates the mapping between XX & ZZ, the processor number, and the inter-processor connection path.

For each enable, flag and status register, Table 8 illustrates the connection path for the XX path and the YY path.

TABLE 8.0

Processor Connection Table

| Processor # | XX Path | ZZ Path |
| --- | --- | --- |
| 0 | 0–1 | 3–0 |
| 1 | 1–2 | 0–1 |

TABLE 8.0-continued

Processor Connection Table

| Processor # | XX Path | ZZ Path |
|---|---|---|
| 2 | 2–3 | 1–2 |
| 3 | 3–0 | 2–3 |

Miscellaneous Interrupt & VME Control Register, MIVR

This register contains the interrupt control bits for the remaining interrupt sources associated with each processor core. The sources include the dual port memory bank, the Vbus expansion daughterboard interrupt, and the global daughterboard interrupt. Each CPU 20 has a unique version of this register that is presented to the CPU 20 at the above address. A given CPU 20 can only access its own register. The enable, flag and status bits operate the same as those for all other interrupt sources.

| Bit Location | | Type | Description |
|---|---|---|---|
| msb | 15 | R/W | Dual Port Interrupt 0 Enable |
| | 14 | R/WC | Dual Port Interrupt 0 Flag |
| | 13 | RO | Dual Port Interrupt 0 Status |
| | 12 | R/W | Dual Port Interrupt 1 Enable |
| | 11 | R/WC | Dual Port Interrupt 1 Flag |
| | 10 | RO | Dual Port Interrupt 1 Status |
| | 09 | R/W | Vbus Daughter Board Int Enable |
| | 08 | R/WC | Vbus Daughter Board Int Flag |
| | 07 | RO | Vbus Daughter Board Int Status |
| | 06 | N/A | Global Daughter Board Int Enable |
| | 05 | N/A | Global Daughter Board Int Flag |
| | 04 | N/A | Global Daughter Board Int Status |
| | 03 | R/W | VME Size 1 |
| | 02 | R/W | VME Size 0 |
| | 01 | R/W | VMERMC |
| | 00 | R/W | VME Word |

Miscellaneous Control Register 0, MCR0

This register contains control bits associated with logic functions within the processor core 10. The FIFO selectbits contain which of the three Bi-directional FIFO paths will be selected when accessing the processing core's Bi-FIFO memory space. The mapping of codes to the FIFO selected is illustrated in table 9.0. The FIFO resets allow the three Bi-directional FIFOs connected to the CPU 20 to be individually reset. Setting the bit will result in forcing a FIFO into reset and holding it there until it is cleared. The LED bits are general purpose bits used to illuminate the processor cores LEDs. Writing a one to a bit position will cause the associated LED to illuminate.

| Bit Location | | Type | Description |
|---|---|---|---|
| msb | 15 | R/W | FIFO Select Bit 1 |
| | 14 | R/W | FIFO Select Bit 0 |
| | 13 | R/W | reserved |
| | 12 | R/W | IP FIFO Reset 2 |
| | 11 | R/W | IP FIFO Reset 1 |
| | 10 | R/W | I/O FIFO Reset 0 |
| | 09–04 | R/W | Reserved |
| | 03 | R/W | LED 3, Red, Illuminated at Reset |
| | 02 | R/W | LED 2, Green, Off at Reset |
| | 01 | R/W | LED 1, Green, Off at Reset |
| | 00 | R/W | LED 0, Green, Off at Reset |

TABLE 9.0

BI-FIFO Select Code to Bi-FIFO Path Mapping

| FIFO Select (S1, S0) | CPU #0 BI-FIFO Path Selected | CPU #1 Bi-FIFO Path Selected | CPU #2 Bi-FIFO Path Selected | CPU #3 Bi-FIFO Path Selected |
|---|---|---|---|---|
| 0, 0 | CPU #0 to CPU #1 | CPU #1 to CPU #2 | CPU #2 to CPU #3 | CPU #3 to CPU #0 |
| 0, 1 | CPU #0 to CPU #3 | CPU #1 to CPU #0 | CPU #2 to CPU #1 | CPU #3 to CPU #2 |
| 1, X | I/O Expansion | I/O Expansion | I/O Expansion | I/O Expansion |

Board Configuration Register, BCR

This register contains configuration and status bits that provide the CPU 20 with information regarding the configuration of the board/system including the board's VME base address, indicators whether daughterboards are attached to the processor core 10 and/or the global bus 14, the CPU's 20 number and the quantity of CPUs 20 contained on the card. All the bits contained in this register are Read Only and may be reguarded as static signals. Each CPU 20 has a private copy of this register.

| Bit Location | | Type | Description |
|---|---|---|---|
| msb | 15 | RO | VME address jumper A15 |
| | 14 | RO | VME address jumper A14 |
| | 13 | RO | VME address jumper A13 |
| | 12 | RO | VME address jumper A12 |
| | 11 | RO | VME address jumper A11 |
| | 10 | RO | VME addressjumper A10 |
| | 09 | RO | VME address jumper A9 |
| | 08 | RO | VME address jumper A8 |
| | 07 | N/A | Reserved |
| | 06 | N/A | Reserved |
| | 05 | RO | Local daughterboard (VBus) Installed |
| | 04 | RO | Global daughterboard Installed |
| | 03 | RO | Processor ID Code Bit 3 |
| | 02 | RO | Processor ID Code Bit 2 |
| | 01 | RO | Processor ID Code Bit 1 |
| | 00 | RO | Processor ID Code Bit 0 |

TABLE 10.0

Processor ID Code to Processor Quantity and ID mapping

| # of Processors Installed | Processor #0 ID Code (3,2,1,0) | Processor #1 ID Code (3,2,1,0) | Processor #2 ID Code (3,2,1,0) | Processor #3 ID Code (3,2,1,0) |
|---|---|---|---|---|
| 1 | 0,0,0,1 | N/A | N/A | N/A |
| 2 | 0,0,1,1 | 0,0,1,0 | N/A | N/A |
| 3 | 0,1,1,1 | 0,1,1,0 | 0,1,0,0 | N/A |
| 4 | 1,1,1,1 | 1,1,1,0 | 1,1,0,0 | 1,0,0,0 |

Global Bus Paging Register, GBPR

The global bus paging register contains control bits that are used whenever a CPU 20 performs a master access on the global bus 14. When a CPU 20 is granted master status on the global bus 14 by the bus arbiter, the contents. of this register are used to drive the upper 12 and lower two bits of the global bus address. These bits allow the limited external address space of the CPU 20. to be augmented such that each CPU 20 can access all global resources including the entire 2 GB address space of the VME Bus. Each CPU 20 has a private copy of this register.

| Bit Location | | Type | Description |
|---|---|---|---|
| msb | 15 | R/W | global Paging Bit 32 (A32 VME Window when set) |
| | 14 | R/W | global Paging Bit 31 |
| | 13 | R/W | global Paging Bit 30 |
| | 12 | R/W | global Paging Bit 29 |
| | 11 | R/W | global Paging Bit 28 |
| | 10 | R/W | global Paging Bit 27 |
| | 09 | R/W | global Paging Bit 26 |
| | 08 | R/W | global Paging Bit 25 |
| | 07 | R/W | global Paging Bit 24 |
| | 06 | R/W | global Paging Bit 23 |
| | 05 | R/W | global Paging Bit 22 |
| | 04 | R/W | global Paging Bit 21 |
| | 03–02 | N/A | Reserved |
| | 01 | R/W | global Paging Bit 1 |
| | 00 | R/W | global Paging Bit 0 |

Global Bus Semaphore Register, GBSR

The global bus semaphore register is each processor cores 10 gateway to the four bank semaphores associated with the GDSS block that separates each processor core 10 from the global bus 14, and the twelve general purpose global bus semaphores. The table at the bottom of the page specifies the protocol for obtaining and then releasing any of the 16 semaphores accessible by the CPU 20. Note: it is important to exercise care in the use of the dual port semaphores as writes to banks of memory not owned by the CPU 20 will be ignored and reads will return non-deterministic data. Each CPU 20 has a private copy of this register. This register provides a local view of semaphores, and can allow a CPU 20 to see semaphores for its banks of memory in the DPSRAM 34, and not the semaphores for the other DPSRAMs 34.

| Bit Location | | Type | Description |
|---|---|---|---|
| msb | 15 | R/W | Semaphore for Bank 3 of Dual Port Sram |
| | 14 | R/W | Semaphore for Bank 2 of Dual Port Sram |
| | 13 | R/W | Semaphore for Bank 1 of Dual Port Sram |
| | 12 | R/W | Semaphore for Bank 0 of Dual Port Sram |
| | 11 | R/W | General Purpose global Semaphore 11 |
| | 10 | R/W | General Purpose global Semaphore 10 |
| | 09 | R/W | General Purpose global Semaphore 9 |
| | 08 | R/W | General Purpose global Semaphore 8 |
| | 07 | R/W | General Purpose global Semaphore 7 |
| | 06 | R/W | General Purpose global Semaphore 6 |
| | 05 | R/W | General Purpose global Semaphore 5 |
| | 04 | R/W | General Purpose global Semaphore 4 |
| | 03 | R/W | General Purpose global Semaphore 3 |
| | 02 | R/W | General Purpose global Semaphore 2 |
| | 01 | R/W | General Purpose global Semaphore 1 |
| | 00 | R/W | General Purpose global Semaphore 0 |

VME Interrupt Control Registers
IPL Gating Control Register, JGCR

The CPU 20 uses this register to decide which IPL levels that the CPU 20 will respond to. Setting a bit in this register will allow a given IPL level to set the associated flag in the interrupt pending register. Whether this will result in an interrupt being generated to the CPU 20 is determined by the state of the IPL's associated enable bit in the IPL Enable Register. Each CPU 20 has a private copy of this register.

| Bit Location | | Type | Description |
|---|---|---|---|
| msb | 07 | R/W | IPL7 Interrupt Gate |
| | 06 | R/W | IPL6 Interrupt Gate |
| | 05 | R/W | IPL5 Interrupt Gate |
| | 04 | R/W | IPL4 Interrupt Gate |
| | 03 | R/W | IPL3 Interrupt Gate |
| | 02 | R/W | IPL2 Interrupt Gate |
| | 01 | R/W | IPL1 Interrupt Gate |
| | 00 | R/W | Reserved |

VME Interrupt Pending Register

The VME IPL Interrupt Pending Register is used by the CPU 20 to determine the cause of EXT_INT4 assertion or to poll the status of IPL conditions that are not enabled to cause interrupts to the processor but are still of interest to the CPU 20. The interrupt acknowledge logic uses the state of all of the processors registers to determine when an interrupt has been fully serviced and another may be acknowledged at that level. If a given bit position is clear for all CPUs 20 the interrupt acknowledge controller is free to acknowledge interrupt at that level. A bit may be set in this register if the associated IPL bit is enabled in the gating register and that IPL condition becomes active. Once a bit becomes set, it is cleared by either reading the vector for the associated IPL level or writing a one to this register in the associated position. Each CPU 20 has a private copy of this register.

| Bit Location | | Type | Description |
|---|---|---|---|
| msb | 07 | RO | IPL7 Interrupt Pending |
| | 06 | RO | IPL6 Interrupt Pending |
| | 05 | RO | IPL5 Interrupt Pending |
| | 04 | RO | IPL4 Interrupt Pending |
| | 03 | RO | IPL3 Interrupt Pending |
| | 02 | RO | IPL2 Interrupt Pending |
| | 01 | RO | IPL1 Interrupt Pending |
| | 00 | RO | Reserved |

IPLx Interrupt Vector Registers, IVR1–IVR7

This register is generally accessed by the CPU 20 in response to data received from the interrupt pending register.

One eight bit register is assigned to each IPL level. The register contains the vector for the last IPL acknowledged to the VIC64 and currently being serviced by the CPUs 20. Each CPU's 20 version of this register is loaded after an IPL level is acknowledged to the VME interface and the interrupt pending bits updated based on the contents of the IPL gating register. The act of reading a given IPL vector register will clear the associated bit position in the interrupt pending register. Each CPU 20 has a private version of this register.

| Bit Location | | Type | Description |
|---|---|---|---|
| msb | 07 | RO | Interrupt Vector Bit 7 |
| | 06 | RO | Interrupt Vector Bit 6 |
| | 05 | RO | Interrupt Vector Bit 5 |
| | 04 | RO | Interrupt Vector Bit 4 |
| | 03 | RO | Interrupt Vector Bit 3 |
| | 02 | RO | Interrupt Vector Bit 2 |
| | 01 | RO | Interrupt Vector Bit 1 |
| | 00 | RO | Interrupt Vector Bit 0 |

Interrupt Structure

The basic system described hereinabove has the ability to handle interrupts to all CPUs 20 from multiple on-board requesters and from the VME bus 12, as well as being able to generate interrupts to the VME bus 12. Multiple sources mapped to each interrupt require that the CPU 20 poll the interrupt status register to determine the source (s). Interrupt sources may be individually enabled to cause an interrupt or poll condition (latched and unconditioned versions)to determine status. The structure is expandable with the ability to support up to eight CPUs 20. Interrupts to the VME bus 12 are handled through the VME interface controller 18.

The CPU 20 has four input pins on which it can receive external inputs, EXT_INT <7 . . . 4>. All four interrupts are edge sensitive (programmable edge). Each interrupt is assigned to a logical function which has multiple interrupt sources behind it. The mapping of logical function to interrupt is illustrated in the following Table 11. In order to ascertain the source of the interrupt, the interrupt handler needs to poll the Interrupt Flag Register.

TABLE 11.0

C6201 Interrupt Source Mapping

| Interrupt Destination | Source |
|---|---|
| EXT_INT7 | IP FIFO Status/Corebus Expansion |
| EXT_INT6 | VME Mailboxes |
| EXT_INT5 | IP Mailboxes |
| EXT_INT4 | VIC64 and VMEbus |

Each motherboard resident interrupt source is associated with three control register bits that affect it's operation. These are the interrupt enable, the interrupt flag, and the interrupt status control bits. The enable bit associated with the interrupt allows the source to generate an interrupt when its status becomes active. When the bit is set, an interrupt will be generated by the condition. The interrupt flag is a latched version of the source that will latch and hold the condition (even after it is rescinded) until the CPU 20 clears a bit by writing a "1"to it. Condition status bit is a raw (unlatched) version of the interrupting condition. The bit will be set when the condition is active (i.e., halffull*="0"). The status bit is read only, while the other two bits are read/write.

The EXT_INT7 interrupt to each CPU 20 is associated with the inter-processor Bi-FIFO 38 that connects the four processor cores 10 to each other and the I/O expansion port 40 (or alternatively IP connection to the DB resident processors). Each CPU 20 may be interrupted based on the status of its side of the three Bi-FIFOs 38 attached to it and the state of the EXT_INT7 enable d field of the Interrupt Enable Register. There are nineteen potential sources for the EXT_INT7 interrupt which are illustrated in Table 12. This table illustrates the bit position of the interrupt enable, the condition flag and the condition status for each source. For the daughterboard interrupt, additional polling may be required if multiple daughterboard interrupt sources exist for the single MVPBus interrupt. The status for interrupt is contained in the interrupt status registers (ISR) 0 and 1, found at 0×0028 0010 and 0028 0014 in the memory map.

TABLE 12

EXT_INT7 Interrupt Control Information

| Interrupt Source | Enable Bit | Flag Bit | Status Bit |
|---|---|---|---|
| IP FIFO XX Out Side Almost Full | IER0 Bit 13 | IFR0 Bit 13 | ISR0 Bit 13 |
| IP FIFO XX Out Side Almost Empty | IER0 Bit 12 | IFR0 Bit 12 | ISR0 Bit 12 |
| IP FIFO XX Out Side Empty | IER0 Bit 11 | IFR0 Bit 11 | ISR0 Bit 11 |
| IP FIFO XX In Side Almost Full | IER0 Bit 10 | IFR0 Bit 10 | ISR0 Bit 10 |
| IP FIFO XX In Side Almost Empty | IER0 Bit 9 | IFR0 Bit 9 | ISR0 Bit 9 |
| IP FIFO XX In Side Empty | IER0 Bit 8 | IFR0 Bit 8 | ISR0 Bit 8 |
| IP FIFO ZZ Out Side Almost Full | IER1 Bit 13 | IFR1 Bit 13 | ISR1 Bit 13 |
| IP FIFO ZZ Out Side Almost Empty | IER1 Bit 12 | IFR1 Bit 12 | ISR1 Bit 12 |
| IP FIFO ZZ Out Side Empty | IER0 Bit 11 | IFR1 Bit 11 | ISR1 Bit 11 |
| IP FIFO ZZ In Side Almost Full | IER1 Bit 10 | IFR1 Bit 10 | ISR1 Bit 10 |
| IP FIFO ZZ In Side Almost Empty | IER1 Bit 9 | IFR1 Bit 9 | ISR1 Bit 9 |
| IP FIFO ZZ In Side Empty | IER1 Bit 8 | IFR1 Bit 8 | ISR1 Bit 8 |
| VBus I/O FIFO Out Side Almost Full | IER0 Bit 5 | IFR0 Bit 5 | ISR0 Bit 5 |
| VBus I/O FIFO Out Side Almost Empty | IER0 Bit 4 | IFR0 Bit 4 | ISR0 Bit 4 |
| VBus I/O FIFO Out Side Empty | IER0 Bit 3 | IFR0 Bit 3 | ISR0 Bit 3 |
| VBus I/O FIFO In Side Almost Full | IER0 Bit 2 | IFR0 Bit 2 | ISR0 Bit 2 |
| VBus I/O FIFO In Side Almost Empty | IER0 Bit 1 | IFR0 Bit 1 | ISR0 Bit 1 |
| VBus I/O FIFO In Side Empty | IER0 Bit 0 | IFR0 Bit 0 | ISR0 Bit 0 |
| IO Expansion Interrupt | MIVR Bit 9 | MIVR Bit 8 | MIVR Bit 7 |

The EXT_INT6 interrupt to each CPU 20 is associated with the Dual Port Memory, DPSRAM 34, mailbox logic. When one of the mailboxes is written to by the current global bus master, the interrupt will be sent to the CPU 20 if it is enabled in the miscellaneous Interrupt and VME Control Register. Each mailbox (four total) has an enable, flag and status bit associated with it. The mailboxes and their associated control register are contained within the DPSRAM 34 that connects the global bus to each of the CPU's 20 local bus. The control information associated with EXT_INT6 is illustrated in Table 7. There are two sets of registers associated with the VME Mailbox logic. The first set of registers is read/write accessible and represents each CPUs 20 outgoing data being passed to the VME bus 12. Each CPU 20 has a private copy of these registers. The second set of registers that is read only represents the data coming in form the VME bus 12. Each CPU 20 has a private copy of these registers.

TABLE 13.0

EXT_INT6 Interrupt Control Information

| Source | Enable Bit | Flag Bit | Status Bit |
|---|---|---|---|
| DPSRAM Mailbox 1 | MIVR Bit 12 | MIVR Bit 11 | MIVR Bit 10 |
| DPSRAM Mailbox 0 | MIVR Bit 15 | MIVR Bit 14 | MIVR Bit 13 |

The EXT_INT5 interrupt of each processor 20 is associated with the inter-processor mailbox logic. When one of the mailboxes is written to, the interrupt will be sent to the processor 20 if it is enabled in the Interrupt Control Register. Each mailbox (four total) has an enable, flag and status bit associated with it. The mailbox is contained within one of the three Bi-FIFOs attached to the processor complex. Two of the Bi-FIFOs are connected to other processor complexes and the third is associated with the I/O expansion site. The control information associated with EXT_INT5 is illustrated in Table 10. There are two sets of registers associated with the IP Mailbox logic. The first set of registers is read/write accessible and represents outgoing data being passed to the other processor 20. The second set of registers that is read only, represents the data coming from the other processor 20.

TABLE 16.0

EXT_INT5 Interrupt Control Information

| Source | Enable Bit | Flag Bit | Status Bit |
|---|---|---|---|
| I/O Mailbox Out | IER1 Bit 7 | IFR1 Bit 7 | ISR1 Bit 7 |
| I/O Mailbox In | IER1 Bit 7 | IFR1 Bit 7 | ISR1 Bit 7 |
| IP Mailbox XX Out | IER0 Bit 15 | IFR0 Bit 15 | ISR0 Bit 15 |
| IP Mailbox XX In | IER0 Bit 14 | IFR0 Bit 14 | ISR0 Bit 14 |
| IP Mailbox ZZ Out | IER1 Bit 15 | IFR1 Bit 15 | ISR1 Bit 15 |
| IP Mailbox ZZ In | IER1 Bit 14 | IFR1 Bit 14 | ISR1 Bit 14 |

The EXT_INT4 interrupt to each processor 20 is associated with interrupts that cause the state of the VME interface's IPL lines to change. These sources include VME interrupts, local Interrupts, VME interface resident mailboxes, error conditions, and general status (such as DMA completion). Additionally, unlike the other interrupt sources that have a unique source for each processor 20, the interrupt source is common to all CPUs 20, and has the ability to interrupt any or all of the processor cores 10 (8 possible). Because of this, significant additional logic is required to control the IPL destinations and the potential multiple interrupt acknowledge cycles coming from the processor cores 10.

Figure 4:
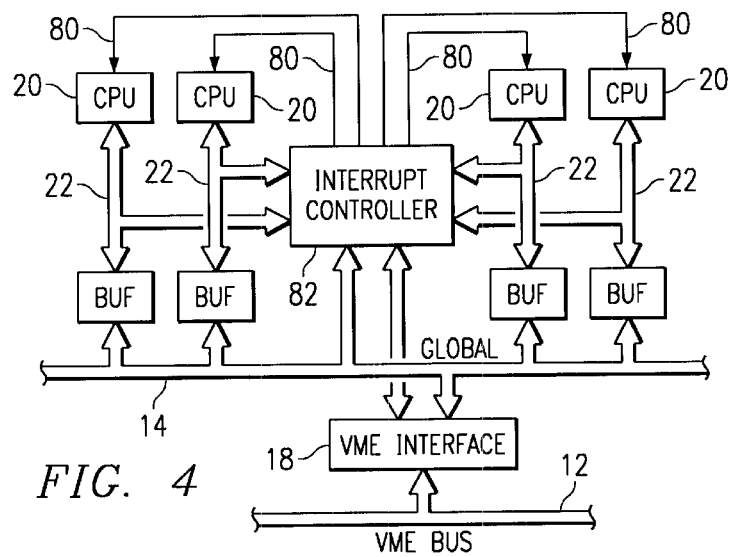
FIG. 4 illustrates a block diagram of the interrupt control.

Referring now to FIG. 4, there is illustrated a block diagram of the architecture for handling interrupts between the VME Bus 12 and the processor cores 10 for each of the associated CPUs 20. Each of the CPUs 20 have a separate interrupt line 80 connected to the EXT_INT4 interrupt input. The interrupt lines 80 are driven by an interrupt controller 82, which interrupt controller 82 interfaces with the CPU local bus 22 for each of the processor cores 10. The interrupt controller 82 also interfaces with the global bus 14 and also directly with the VME Interface 18 for receiving interrupt information therefrom.

As will be described in more detail herein below, the interrupt controller 82 is basically a steering device. Whenever an interrupt is received from the system over the VME Bus 12, the VME Interface 18 in conjunction with interrupt controller 82 treats the CPUs 20 as if there were a single CPU 20 on the global bus of the VME Interface 18. Each of the CPUs 20 are programmed such that it downloads information to the interrupt controller 82 as to what interrupt(s) it will handle. The interrupt controller 82 is operable then to receive the interrupt from the VME Interface 18 and steer this interrupt to the appropriate one or more of the CPUs 20. The interrupt controller 82 will send back a single acknowledgment signal when the interrupt has been serviced. The interrupt controller 82 will therefore monitor the CPU 20 side of the global bus 14 to determine if the CPUs 20 have in fact serviced the interrupt directed thereto.

Figure 5:
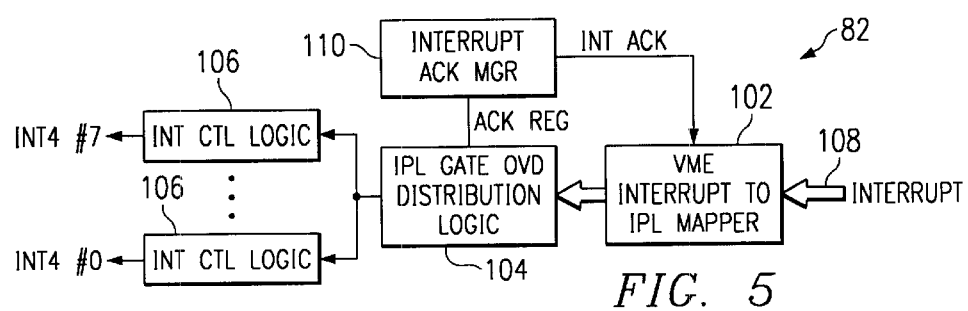
FIG. 5 illustrates a more detailed block diagram of the interrupt controller.

Referring now to FIG. 5, there is illustrated a high-level block diagram of the interrupt controller 82. The interrupt controller 82 sits between 19 potential interface interrupt sources on the VME Bus 12 and the EXT_INT4 inputs of each of the CPUs 20. The interrupt sources are input on an interrupt line 100 to an interrupt-to-IPL Mapper Block 102. This block handles the matching of interrupt sources to the various IPL levels. The output of the Mapper Block 102 is input to a Distribution Logic Block 104, which is contained in the VME Interrupt Control Array, this Block 104 handling the conversion of individual IPL codes to an edge interrupt that can be presented to each (or all) CPU's EXT_INT4 Interrupt Control Logic. The output of this will drive Enable Logic Blocks 106 which are common to all of the interrupt inputs, this controlling whether the conditioned interrupt source reaches a given one of the processor cores 10. Additionally, there is provided an acknowledge block 110 which is operable to generate an interrupt acknowledge signal back to the mapper block 102 which indicates that the interrupts have been serviced.

The mapper block 102 is responsible for encoding the 19 possible interrupt sources onto the IPL outputs that are presented to the IPL gate logic 104. The interrupt to IPL Mapper can encode each interrupt or interrupt group to any of seven levels, as programed by the Interrupt Handler Register (IHR) contained in the VME Interface 18. The contents of the these registers are loaded by CPU 20 in processor core 10 (#0) after reset. Once programmed, the IPL lines will reflect the state of the highest ranked interrupt source. Table 17 illustrates the 19 possible interrupt sources and their respective ranking.

TABLE 17.0

VME Interrupt Source and Ranking

| Priority Rank | Interrupt Description |
|---|---|
| 1 | LIRQ7 |
| 2 | Error Group Interrupt |
| 3 | LIRQ6 |
| 4 | LIRQ5 |
| 5 | LIRQ4 |
| 6 | LIRQ3 |
| 7 | LIRQ2 |
| 8 | LIRQ1 |
| 9 | ICGS Group Interrupt |
| 10 | ICMS Group Interrupt |
| 11 | IRQ7 |
| 12 | IRQ6 |
| 13 | IRQ5 |
| 14 | IRQ4 |
| 15 | IRQ3 |
| 16 | IRQ2 |
| 17 | IRQ1 |
| 18 | DMA Status/Complete Interrupt |
| 19 | VME Interrupt Acknowledge |

The IPL pending and Distribution Logic Block 104 converts the IPL code received from the VME Interface 18 into a pulse input that drives the EXT_INT4 interrupt controller Logic for each CPU 20. The logic performs gating functions based on the contents of each CPU's 20 Gating Register (IGR=0x0028 0100) and the state of the Interrupt Acknowledge Controller. The format of each IPL Gating Register is illustrated in Table 18. Each CPU 20 has a unique copy of this register located at the same address, and can only access its copy of this register. Each bit location within the byte is assigned to a given IPL code. If the bit associated with that IPL code is set, then the output of the distribution logic block 104 to that CPU 20 is pulsed when the appropriate IPL code is presented and no other interrupts at the IPL level are outstanding. This results in the associated flag being set in that CPU's 20 IPL Interrupt Pending Register (logically equivalent to Flag Register). It is noted that multiple processor enables for the CPUs 20 maybe set for a given IPL code. If no outstanding interrupts for a given IPL level are present, the Interrupt Acknowledge Logic will fetch and latch the interrupt vector from the VME Interface 18. Once the vector is latched, the interrupt will be sent off to the Processor Enable Logic.

TABLE 18.0

IPL Gating Register Byte Format

| Bit 7 | Bit 6 | Bit 5 | Bit 4 | Bit 3 | Bit 2 | Bit 1 | Bit 0 |
|---|---|---|---|---|---|---|---|
| IPL 7 | IPL 6 | IPL 5 | IPL 4 | IPL 3 | IPL 2 | IPL 1 | Reserved |

Due to the ability to support multiple interrupts and due to limitations of hardware, there is a window of opportunity where the actual interrupt pulse may be missed by the CPU 20. This situation occurs between the time that an interrupt has occurred but not been acknowledged. If a new interrupt occurs at this time, the CPU 20 will miss it. However, the interrupt service routing can handle this condition and essentially recover the missing interrupts. During the interrupt acknowledge cycle the CPU 20 will read the contents of its Interrupt Pending Register. The contents of this register will indicate if multiple outstanding interrupts exist, even though the CPU 20 is only responding to one. After servicing the highest priority interrupt, the CPU 20 can re-read the IPR to determine if the bits associated with it are "0." If not, the CPU 20 can service the next interrupt and repeat until it is "0." Because the pending interrupt information is latched, and subsequent interrupts are gated via the Controller 110, interrupts will not be lost.

The Acknowledgment Manager 110 is responsible for servicing interrupt acknowledgments and vector passing between the multiple CPU 20 and the VME interface 18. Additionally, through interface with the Distribution Logic 104, the interrupting acknowledgment Manager Block 110 effectively throttles the interrupts heading to the CPUs 20. The initial problem needing to be solved is that the VME Interface 18 is only expecting a single processor to respond to an interrupt. Once an acknowledge is sent back to the VME Interface 18, the vector associated with it is lost forever. Therefore, a latch is employed for each IPL level to retain the state of a vector until all of the processors 20 have a chance to respond. No additional interrupts for a given IPL level can be passed until the previous interrupt at that level has been fully responded to. Otherwise, interrupt overrun would occur, resulting in lost interrupts.

Because an interrupt vector is lost once a single interrupt acknowledge cycle has been performed to the VME Interface 18, the Interrupt Acknowledge Manager 110 must latch the value presented to the VME Interface 18 during the first interrupt acknowledgment for the eight possible interrupt acknowledge cycles coming from the CPUs 20. Once the Control Logic determines that an IPL code can be acknowledged, it asserts a global bus request. After it gains control of the global bus 14, it will perform an interrupt acknowledge cycle, latch the interrupt vector byte for the specific IPL code into its associated Interrupt Vector Register, update the associated Interrupt Pending Register Byte, and then release the global bus 14.

The Interrupt Acknowledge Manager 110 operates based on the contents of eight 8-bit read only registers that are bit-wise auto-loaded with the contents of the IGR registers when an IPL code is acknowledged. These registers, Interrupt Pending Registers (1 per CPU 20), contain information concerning how many CPUs 20 have responded to each IPL level. Seven bits in each register (the lower bit of each register is reserved) are each associated with an IPL code. The organization of this register is illustrated in the Table 19. When the register is initially loaded at the time of the interrupt acknowledge, the bit will be loaded with a "1" if the associated bit is set in that CPU's IGR. As the CPU 20 performs an interrupt acknowledge cycle by reading the Interrupt Vector Register (IVR, 1 per IPL Code ), the bit position associated with that CPU 20 and IPL code is reset as CPUs poll this register.

TABLE 19:0

Interrupt Pending Register (IPR) Format

| Bit 7 | Bit 6 | Bit 5 | Bit 4 | Bit 3 | Bit 2 | Bit 1 | Bit 0 |
|---|---|---|---|---|---|---|---|
| IPL 7 | IPL 6 | IPL 5 | IPL 4 | IPL 3 | IPL 2 | IPL 1 | Reserved |

TABLE 20.0

Interrupt Vector Register (IVR) Organization

| Description | global bus Address | Type |
|---|---|---|
| IPL 1 Interrupt Vector Register | 0x 0028 0108 | RO |
| IPL 2 Interrupt Vector Register | 0x 0028 010C | RO |
| IPL 3 Intemip Vector Register | 0x 0028 0110 | RO |
| IPL 4 Interrupt Vector Register | 0x 0028 011 | RO |
| IPL 5 Interrupt Vector Register | 0x 0020 0118 | RO |
| IPL 6 Interrupt Vector Register | 0x 0028 011C | RO |
| IPL 7 Interrupt Vector Register | 0x 0028 0120 | RO |

The value of IPR is additionally utilized by the Interrupt Acknowledge Controller to determine when a new IPL level can be acknowledged. If the value of this bit (1 per IPR) for a specific IPL code is non-zero when that code is presented to the IPL gate logic, it indicates that the previous interrupt at that IPL level has not been acknowledged by all enabled CPUs 20. An acknowledge for the new interrupts cannot occur or Interrupt overrun (and loss) would occur. If the bits associated with an IPL is zero when the IPL is presented again, the Controller 82 will arbitrate for the global bus 14, the interrupt will be acknowledged, the vector loaded and the IPR bits associated with the IPL code loaded with contents of the associated IGR bit. In this manner, multiple CPUs 20 can respond to multiple outstanding interrupts without interrupt or vector loss.

Each IPL code will have two control bits associated therewith, the enable bit and the pending bit. These control bits are contained in two 8-bit registers accessible through Distribution Logic Block 104. The format of the control registers is illustrated below in Table 15.

TABLE 21:0

EXT_INT4 Interrupt Control Register Format

| Description | Bit 7 | Bit 6 | Bit 5 | Bit 4 | Bit 3 | Bit 2 | Bit 1 | Bit 0 |
|---|---|---|---|---|---|---|---|---|
| EXT_INT4 Enable Reg | IPL 7 | IPL 7 | IPL 6 | IPL 5 | IPL 4 | IPL 3 | IPL 2 | Reserved |
| EXT_INT4 Pend Reg | IPL 7 | IPL 7 | IPL 6 | IPL 5 | IPL 4 | IPL 3 | IPL 2 | Reserved |

Figure 6:
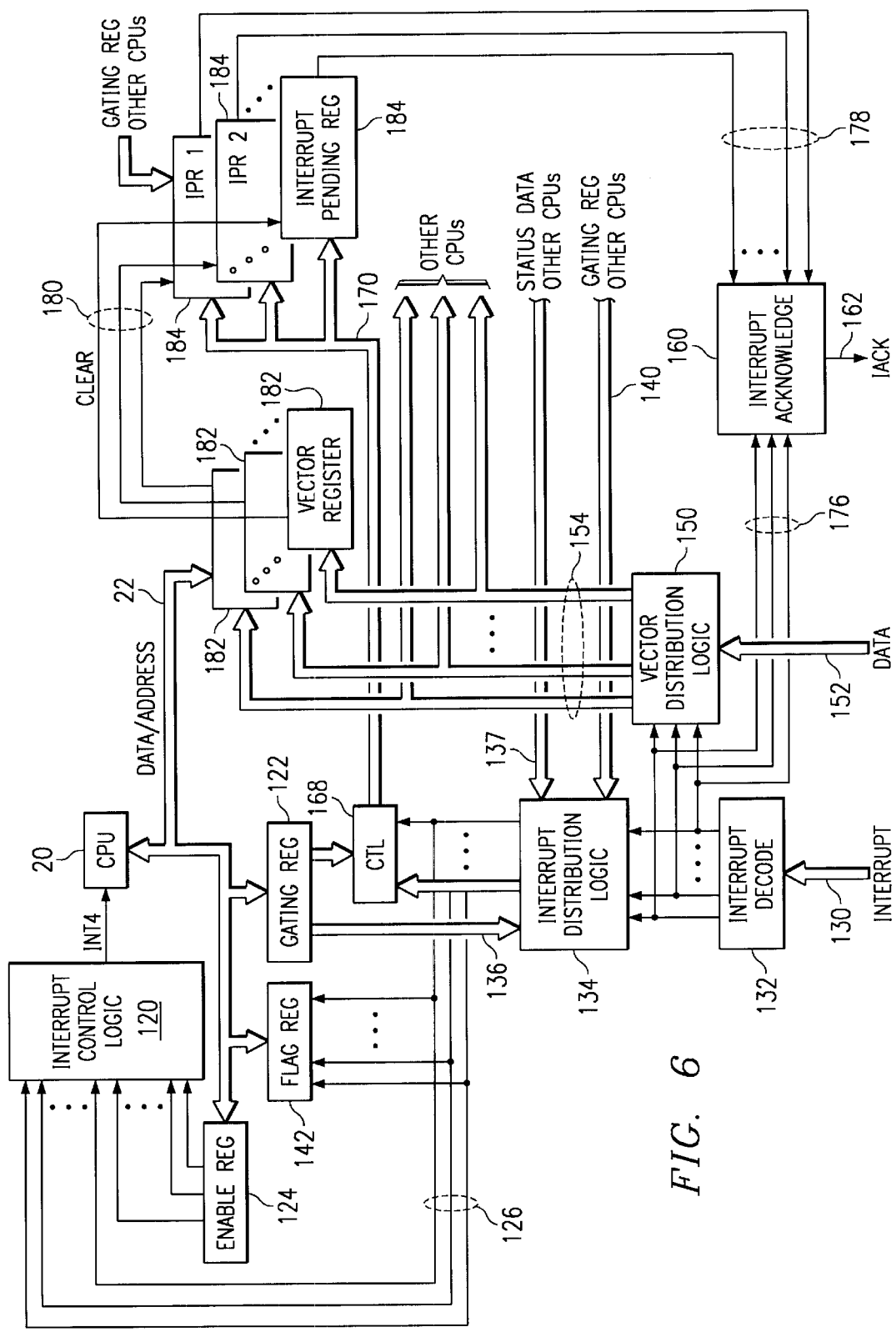
FIG. 6 illustrates a block diagram of the distribution logic of the interrupt controller.

Referring now to FIG. 6, there is illustrated a block diagram of the interrupt controller 82. Which describes the servicing of the interrupt from both the system bus side and the CPU side. For illustrative purposes, only one CPU 20 is illustrated, it being understood that multiple CPUs can be incorporated into the array, and alternatively, a single CPU 20 could be utilized. Each of the CPUs 20 receives on the input thereof an external interrupt, EXT_INT4. This interrupt is one of multiple interrupts at the CPU 20 will accommodate. This interrupt is generated by interrupt control logic 120. The interrupt generated by this interrupt control logic block 120 indicates to the CPU 20 that there has been an interrupt generated on the system bus side of the array that is to be serviced by the CPU 20.

The CPU 20 determines which interrupts it will service. Once this is determined, it will load information regarding these interrupts into a gating register 122, as described hereinabove, which has associated therewith one bit for each interrupt level. Once it determines which interrupts it will service, it sets these particular bits it sets its gating register 122, it being understood that there is one gating register per CPU 20. The gating register 122 is an addressable register that is accessed from the local bus 22.

The CPU 20 not only determines which interrupts it will service, but also which interrupts it desires to examine. The gating register 122 will have the bits set therein that are associated with all interrupts that it both service and will poll. For interrupts that it will service, it will subsequently run an Interrupt Service Routine (ISR) the ones that it will poll, it does not run the ISR. In order to determine which interrupts it will actually service with the ISR, an enable register 124 is provided which is interfaced with the local bus 22 to allow the CPU 20 to store therein the interrupts that it will service, there being one bit for each interrupt and there being one enable register 124 per CPU 20. The contents of the enable register are input to the interrupt control logic block 120. In addition, there are provided status lines 126, one for each interrupt level, which are compared to contents of the enable register 124. The status lines 126 indicate the that there is an interrupt that is to be serviced or polled by the CPU 20, as indicated by the contents of the gating register 122. This will be described in more detail herein below.

Whenever an interrupt is received, it is received on a 3 bit bus 130, this providing for a binary encoding of a seven interrupt levels. This is decoded by an interrupt decode block 132 to provide seven decode output lines which are then input to interrupt distribution logic block 134. The interrupt distribution logic block 134 receives an input from each of the gating registers 122 for each of the CPUs 20. For the CPU 20 illustrated, the gating register provides an output on a bus 136 for input to the interrupt distribution logic block. A group of buses 140 receive the instructions from gating registers of other CPUs 20. The interrupt distribution logic block 134 provides on the output thereof a status bit. Theses status bits are provided on status lines 126 for the illustrated CPU 20. These are input to the interrupt control logic block 120, as described herein above, and also to a flag register 142. The flag register 142 will have the flag set for each status bit that is set by the interrupt distribution logic block 134. The interrupt distribution logic block 134 will only set the status bits associated with a received interrupt that compares with the serviceable or pollable status bits defined in the gating register 122 associated with that CPU 20, which status bits are delivered to the other CPUs 20 through a group of status lines 137. This flag register 142 is addressable from the local bus 22 side. Therefore, the CPU 20, after receiving its external interrupt EXT_INT4, will then examine the contents of the flag register 142 in order to determine which interrupt it is to service. The CPU 20 will service the interrupts in a priority based upon the interrupt number, the highest priority interrupt being serviced first.

When the interrupt is received on the interrupt bus 130, a vector distribution logic block 150 is operable to transfer interrupt vectors from a data bus 152, which transfer the vectors from the VME bus 12 through the global bus 14 to a plurality of vector registers 182. The vector registers 182 are registers that store a vector for a single interrupt level. If there are seven interrupt levels, then there will seven vector registers 182. These vector registers are accessible by each of the CPUs 20. There can be a separate set of vector registers 182 for each of the CPUs 20 or there can be one global set. However, whenever an interrupt is generated from the system side, the vector distribution logic block 150 will route the vector to the appropriate one of the vector registers 182 and latch it therein. In the illustrated embodiment, there are provided a plurality of distribution buses 154 that are operable to transfer the information from the vector distribution logic block 150 to the appropriate vector register 182. It being understood that these can essentially be one bus 154 that can address the multiple registers 182. These buses 154 also go to vector registers 182 associated with the other CPUs 20.

In order to perform an acknowledge of the servicing of an interrupt back to the system bus, an interrupt acknowledge block 160 is provided which generates an interrupt acknowledge signal on a line 162, which is delivered back to the system side of the VME interface 18. The interrupt acknowledge block 160 examines the contents of a plurality of interrupt pending registers 184. There is provided a single interrupt pending register (IPR) 184 for each of the interrupt levels. The contents of the pending registers are set whenever an interrupt designated for a particular CPU 20, as defined by the contents of the gating register 122, is to be serviced by that CPU 20. The contents of the gating register 122 are compared to the presence of the logic state on the status lines 126 to generate the control bits for the interrupt pending registers 184, the control bits transferred thereto on lines 170. Since the interrupt pending registers 184 have a bit associated with each processor, the interrupt acknowledge block 160 can determine if any of the bits in any of the registers 184 are still set. For example, if all CPUs in an array were to service IPL7, then each CPU's 20 interrupt pending register bit associated with IPL7 would be bits set therein. The interrupt acknowledge block 160 would receive both indication on lines 176 from the output to the decode block 132 indicating the interrupt that was generated and also would receive the pending bits on lines 178 from the interrupt pending registers 184. Since the interrupt acknowledge block 160 is aware that an IPL7 was generated, it will not generate the acknowledge signal on line 162 until the all bits in the IPL7 portion of the interrupt pending registers 184 have been cleared. These bits are cleared whenever the contents of the vector registers 182 are read by the CPU 20, the vector register 182 interfaced with the local data bus 22. Each of the vector registers 182 outputs a Clear signal on lines 180 to the interrupt pending registers 184.

Figure 7:
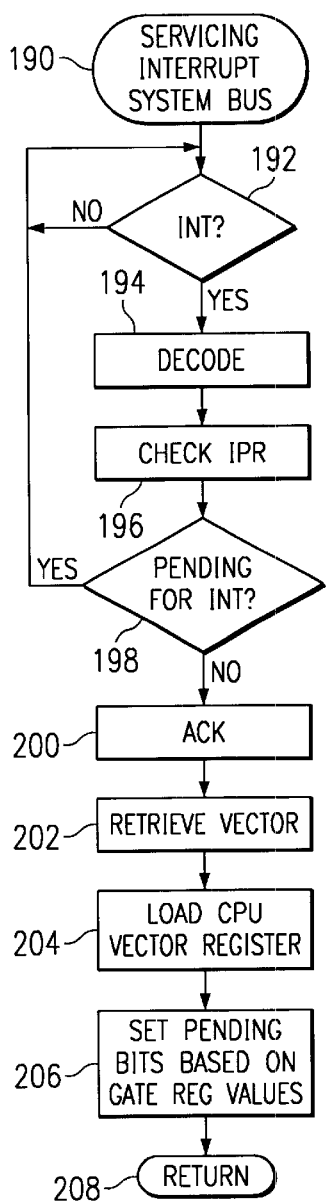
FIG. 7 illustrates a flow chart for the System Bus interrupt servicing operations.

Referring now to FIG. 7, there is illustrated a flow chart depicting the operation of servicing the interrupt on the system bus side. This initiated at a block 190 and then proceeds to a decision block 192 to determine if an interrupt has occurred on the system bus side. If not, the program will flow back to the input thereof and, if so, the program will flow to a function block 194 to decode the interrupt and then to function block 196 to check the interrupt pending register. As described herein above, the interrupt pending registers will determine if any pending interrupts are present for that given interrupt. This is determined in a decision block 198. If there is a existing pending interrupt, the program will flow back to the input of decision block 192 in order to continue checking the associated IPR 162. When all pending interrupts have been cleared for that interrupt, the program will flow from decision block 198 to an acknowledge block 200 in order to acknowledge that the interrupt has been received and then to a function block 202 in order to retrieve the interrupt vector for latching in the vector register 182. The program will then flow to a function block 204 to load the vector register and then to a function block 206 to set the pending bits based on the gate register values. The program will flow to a return block 208.

Figure 8:
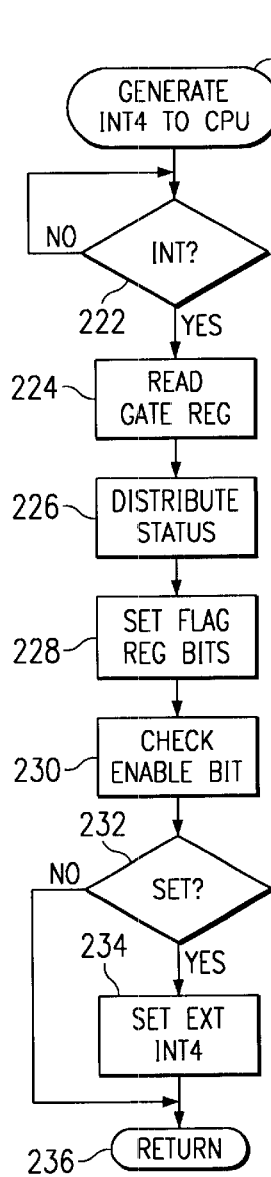
FIG. 8 illustrates a flow chart depicting the operation of the Eternal Interrupt to the CPU.

Referring now to FIG. 8, there is illustrated a flow chart depicting the operation for generating the external interrupt to the CPU 20, the interrupt EXT_INT4 is initiated at block 220 and then proceeds to a decision block 222 to determine if an interrupt has been received from the system bus. If not, the program will flow back to the input of decision block 222 and, as so, the program will flow to a function block 224, where the contents of the associated gate register 122 are read. The program will then flow to function block 226 to distribute the status bits. The program will flow to a function block 228, wherein the flag register bits will be set for later access by the CPU 20. The interrupt control logic block 120 will then check the enable bit, as to find in a function 230 and then flow to decision block 232 in order to determine whether the enable bit for the particular activated status line 126 is set. If so, the program will flow along a "Y" path to function block 234 in order to set the external interrupt, EXT_INT4. The program will flow then to return block 236. If the enable for the associated active status line 126 is not set, the program will flow from the decision block 232 to the return block 236.

Figure 9:
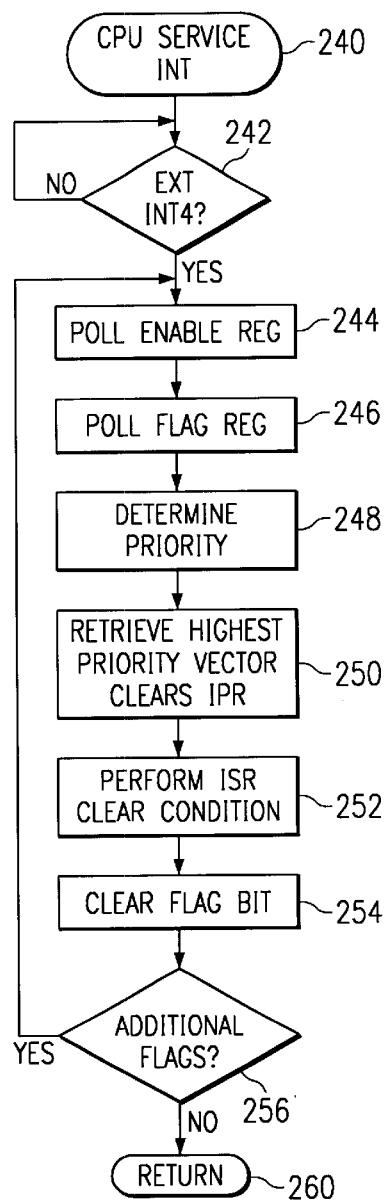
FIG. 9 illustrates a flow chart for the interrupt service operation on the CPU side.

Referring now to FIG. 9, there is illustrated a flow chart depicting the CPU service operation for the interrupt when the external interrupt, EXT_INT4, is received. This flow chart is initiated a block 240 and then proceeds to a decision block 242 wherein it is determined whether the external interrupt, EXT_INT4, has occurred. If not, the program will flow back to the input of the decision block, and, if so, the program will flow to a function block 244 wherein the enable register 124 will be polled. Thereafter, the flag register will be polled, as indicated by a function block 246 and then the priority of the interrupt determined is indicated by function block 248. The flag register will indicate all of the interrupts that exist wherein the enable register 244 will indicate the ones of the flag register bits that are to be serviced. Thereafter, the highest priority vector will be retrieved by the CPU 20 from the associated vector register 152, as indicated by function block 250. This reading of the vector register 122 will clear the related bit position of the IPR. The program then flows to a function block 252 where the CPU 20 performs the Interrupt Service Routine (ISR) and then the condition is cleared. The program then flows to function block 254 wherein the flag bit is cleared and then to a decision block 256 to determine if additional flags have been set. If so, the program will flow along the "Y" path back to the input of function block 244. When all flags have been reset, then the program will flow to a return block 260.

Figure 10:
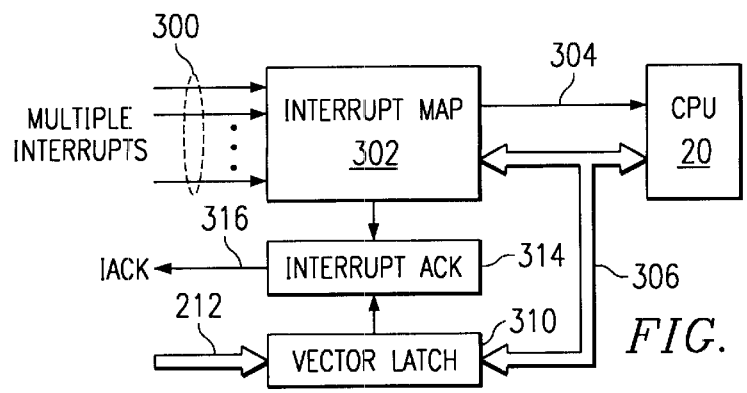
FIG. 10 illustrates a block diagram of an interrupt mapping scheme for a single CPU.

Referring now to FIG. 10, there is illustrated a block diagram illustrating the use to the interrupt controller with a single CPU 20. If a single CPU 20 is provided, the purpose of the interrupt controller would be to receive multiple inputs on interrupts lines 300 and map those interrupts through an interrupt mapping block 302 into a single interrupt line 304, for input to the CPU 20. The interrupt mapping block 302 will contain information as to which interrupt generated a single interrupt which can be read by the CPU 20 through a bus 306. The CPU 20, once determining the interrupt that is responsible for generating the single interrupt, will then read the contents of the vector latch 310 which receives and latches vectors from a data bus 312. The interrupt mapping block 302 and vector latch 310 will interface with an interrupt acknowledgment block 314 which will generate an acknowledgment signal on line 316 whenever the contents of the vector latch have been read, indicating that the CPU 20 has serviced the interrupt, and will prevent.

Dual Port SRAM

Figure 11:
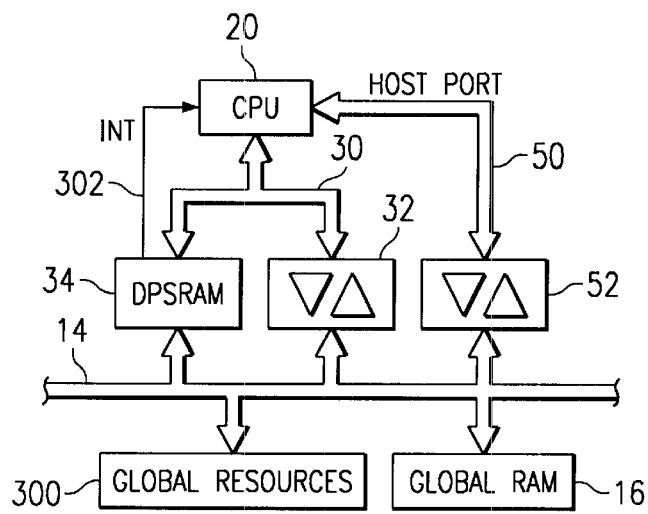
FIG. 11 illustrates a block diagram of the DPSRAM structure.

Referring now to FIG. 11, there is illustrated a detailed block diagram regarding the operation of the DPSRAM 34. In general, the CPU 20 in a conventional mode will receive information from the global bus 14 and from one of multiple global resources, as illustrated by block 300 on the global bus 14, through the host port in the CPU 20. This is performed in a conventional operation which requires in general two accesses. The first access by the global resources 300 in the conventional mode will require writing of the data to the global RAM 16. The second access is for the CPU 20 to then access the information in the global RAM 16. Of course, during storage of data in the global RAM 16, the system must undergo some type of addressing of the CPU 20 to ensure that it is that CPU 20 that constitutes the destination CPU. In this mode, the global RAM 16 is essentially a "scratchpad" memory device. With this type of operation, there is only one region of the global address space that will be designated as the common area for writing to any of the CPUs 20 in the system.

In the present invention, the DPSRAM 34 allows each CPU 20 to have a designated portion of the global address space associated therewith. Therefore, whenever any of the global resources 300 desires to write information to the CPU 20, it need only write directly to the address space, such that the CPU 20 now constitutes an addressable entity on the global bus 14 within its address space. The DPSRAM 34 facilitates this feature while isolating the global address space from the local address space of a particular CPU 20. The DPSRAM 34 is basically a single bank of memory of 256 Kbytes, on each side, arranged in a 64 K×32 configuration on each side, one port on the global side and one port on the local side. The performance specifications for the DPSRAM 34 are as follows:

| | |
|---|---|
| DPSRAM, local side | |
| Size (per processor) | |
| Standard: | 256 Kbytes, 4 Banks, 64K × 32 |
| Arbitration: | None, but may need to obtain semaphore |
| CPU 20 Access: | 0 Wait State, 4 clock access, 200 MB/s @ 32 bits |
| VME Access: | No |
| DPSRAM, global side | |
| Size (per processor) | |
| Standard: | 256 Kbytes, 4 Banks, 64K × 32 |
| Arbitration: | None, but may need to obtain semaphore |
| CPU 20 Access: | 32 bit, 6 clock access after global bus arbitration |
| VME Access: | Yes, A32: D32, D32 Word, D32 Byte, D32 Block, D64 Block |
| | A24: D32, D32 Word, D32 Byte |
| | A16: Not accessible |

The DPSRAM 34 is of the type 1017028, manufactured by IDT, which is interfaced with the CPU 20 via an interrupt line 302. The interrupt line 302 will send an interrupt to the CPU 20 anytime that data is written into the DPSRAM 34 mailbox register by any global resource. Once written thereto, the CPU 20 can service the information stored in the DPSRAM 34 from the local side via the intermediate bus 30.

Figure 12:
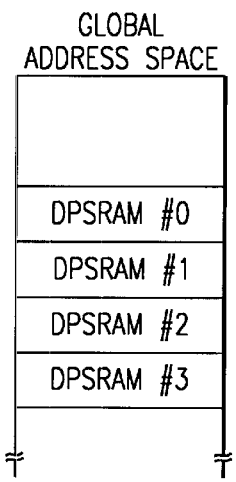
FIG. 12 illustrates a diagrammatic view of the global address space illustrating the dedicated space for the DPSRAM of all processor nodes.

Referring now to FIG. 12, there is illustrated a diagrammatic view of the global address space. It can be seen that each processor node has associated therewith a defined region in the global address associated with its DPSRAM 34. Therefore, whenever a global resource 300 desires to send information to any CPU 20 at any of the processor nodes 10, it need only generate the address for the particular DPSRAM 34. Since this occupies an address space in the global address space, a single Write operation will write the information to the DPSRAM 34 for the designated CPU 20 and the next access cycle on the global bus 14 can write information to the DPSRAM 34 of another CPU 20 or to that CPU 20. The access cycle involves first writing to the DPSRAM address the block of data. Thereafter, the global resource writes to the mailbox in the DPSRAM 34, which action causes the interrupt EXT_INT6 to be generated. Further, in another aspect of the operation of the DPSRAM 34 in conjunction with the CPU 20, the CPU 20 itself can access another CPU 20 via that CPU's DPSRAM address. This is facilitated through the buffer 32, which is the path that is utilized by the CPU 24 to gain access both to the VME or other global resources in the block 300. In this mode, a CPU 20 on another processing node constitutes a global resource to a given CPU 20 when that CPU 20 is acting as master. In general, the buffer 32 is utilized for data that is being transferred to and from the global bus 14 by the associated CPU 20. Without the DPSRAM 34, the CPU 20 would have to access another CPU via conventional methods, wherein the data would first have to be stored in the global RAM 16 and then instructions sent to another CPU 20 in order for it to access the data from the global RAM 16 designated thereto.

Data can be transferred from the CPU 20 to the global resource 300. This is facilitated in the same manner as transferring data from the global resource 300 to the CPU 20. Data is first transferred to the DPSRAM 34 on the local side thereof by the CPU 20. On the local side of the DPSRAM 34 in the local address space, a designated resource on the global bus must have a defined address in the local address space. By writing to this address, the global resource to which it is directed can retrieve the data. After writing the data, then the mailbox for that resource, a dedicated mailbox, is written to. This generates an interrupt for the global resource, which global resource can then access the global side of the DPSRAM 34 for retrieval of the data therefrom.

Figure 13:
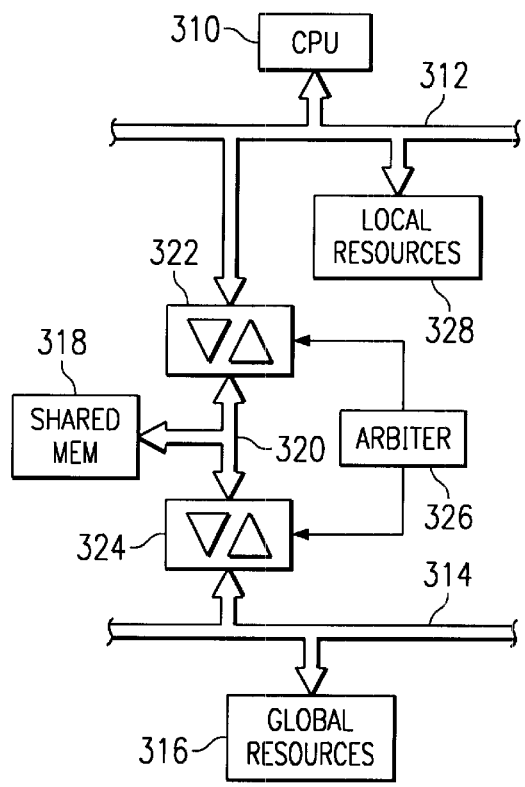
FIG. 13 illustrates a prior art global shared memory.

Referring now to FIG. 13, there is illustrated a block diagram of a prior art system for providing a shared or distributed global memory operation. In this operation, a CPU 310 is interfaced with a local bus 312, which is separated from a global bus 314, the global bus 314 being the same as the global bus 14 described hereinabove. Interfaced with the global bus 314 is a global resource 316. This global resource 316 can be a VME system bus, it can be global RAM or it can be another CPU. In order for there to be some memory transfer between the global resource 316 and the CPU 310, there needs to be some type of memory. This is provided with a shared memory 318, which is interfaced with an intermediate bus 320. The intermediate bus 320 is interfaced with the local bus 312 through a buffer 322 and with the global bus 314 through a buffer 324. An arbiter 326 is provided for determining when the data is transferred between the CPU 310 and the shared memory 318 or between the global resource 316 and the shared memory 318. Although not shown, both the CPU 310 and the global resource 316 have a control connection with the arbiter 326. The shared memory 318 is to be distinguished from local resources in a block 328 which are directly addressable by the CPU 310 through its local bus 312. In a local access, there is no need to request access through a global memory address, as the local resource 328 resides in the local memory space of the CPU 310. However, when the CPU 310 desires to transfer information to the global bus 314 and to the global resource block 316, one way to achieve this is to transfer data to the shared memory 318 after gaining access thereto. When the CPU 310 has access to shared memory 318, the global resource 316 cannot have access thereto. After data is transferred to the shared memory 318, the global resource 316 will then be apprised of the presence of data in the shared memory 318 and will then access the shared memory 318 at a defined address. A shared memory block 318 can be provided for in multiple processor nodes on the global bus 314. This allows the global resource to access the multiple shared memories at different times and, when writing data to another of the shared memories 318, data previously written to memory 318 can be simultaneously accessed for a Read or a Write operation.

One disadvantage to the distributed memory of FIG. 13 is that, even though each shared memory block 318 will have a separate address in the global address space, it must first have dedicated access to the shared memory 318, transfer data thereto and then provide an indication to the CPU 310 that there is data to be retrieved. Therefore, the global resource 316, or the CPU 310, must have complete access to the shared memory 318 to the exclusion of the other of the CPU 310 or the global resource 316.

Figure 14:
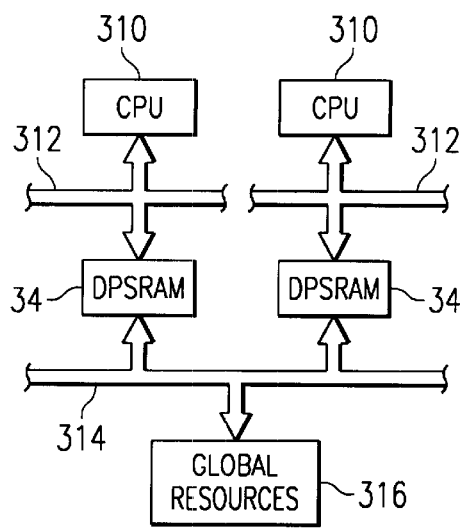
FIG. 14 illustrates the shared memory aspect of the dual port memory of the present invention.

Referring now to FIG. 14, there is illustrated a simplified block diagram of the DPSRAM 34 as implemented in the embodiment of FIG. 13, wherein like numerals refer to like parts in the two FIGUREs. With the DPSRAM 34 disposed between the local bus 312 and the global bus 314, the global resource block 316 has a means to communicate with the CPU 310. However, it is important to note that the difference between the shared memory block 318 and the DPSRAM 34 is that the global resource 316 has dedicated access to the DPSRAM 34 for transferring data thereto or retrieving data therefrom. Although there is a semaphore that must be retrieved before it can actually write to or read from the DPSRAM 34, the read/write operation is independent of the read/write operation of the CPU 310 in the local address space thereof. Therefore, each of the DPSRAMs 34 occupy a defined portion of the global address space, which defined portion of the global address space is independently accessible by the global resources 316 from the CPU 310.

Figure 15:
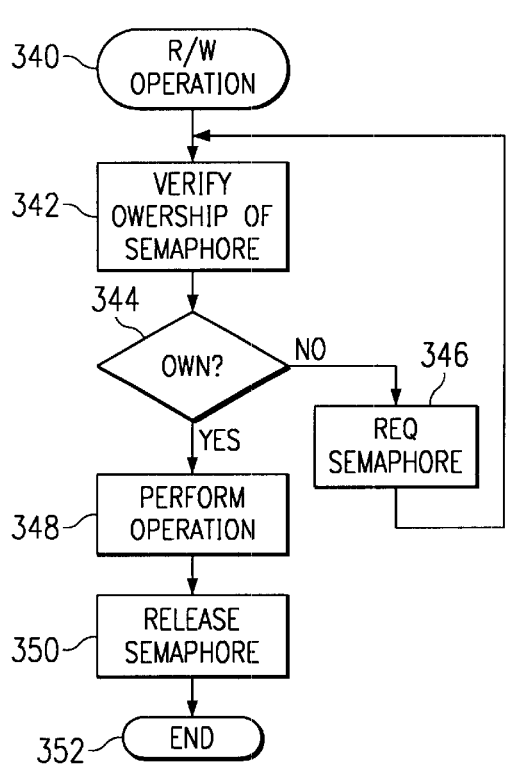
FIGS. 15 and 16 illustrate flow charts depicting the semaphore operation for interfacing with the dual port memory.

Referring now to FIG. 15, there is illustrated a flow chart depicting the semaphore operation to determine how the CPU 20 will access the DPSRAM 34 for a read/write operation and also how the global resource side of the global bus 14 will access the DPSRAM 34. In general, in the DPSRAM 34, there is a single memory cell for each storage location that is accessible from either side of the dual port memory. However, since there is only one cell, there can only be one side accessing at a given time for a write operation. The dual port memory has associated therewith logic to prevent simultaneous access thereto to ensure that there is no contention problem. There is provided global semaphore registers to facilitate this.

The global bus 14 has eleven general purpose semaphores (on a dual processor application) that on a bit by bit basis are shared between the processor cores 10, between each processor core 10 and the VME bus 12, or between all three. The semaphores are accessed by each CPU 20 through the Global (perceptually) Miscellaneous Control Register. Four semaphores are shared between the CPUs 20, and are accessed through bits 12 through 15 of the MCR2. Four semaphores are shared between each CPU 20 and the VME bus 12 and are accessed through bits 8 through 11 of the MCR2. The final semaphore is shared between all processor cores 10 and the VME bus 12. This semaphore is accessed from the CPU 20 side via bit 0 of the MCRI. The VME bus 12 accesses these semaphores through its Global Semaphore Register accessed at Base Addr+0000 0030. The semaphores are contained in the upper 8 bits of the register. Four bits are shared with processor core 0, four bits with processor core #1, and 1 bit shared between all three.

In all cases, each semaphore bit operates as follows. Reading a zero indicates that the semaphore is available. If it is available, a "1" is written to the bit to request it. This is followed by a read to confirm that the semaphore has been granted to the CPU 20 (automatically resolved by hardware during contention). If set, the CPU 20 owns the semaphore. To release the semaphore, the owning CPU 20 writes a 0 to that bit. At reset, all semaphores are set to be available. There is also a dual port semaphore provided on in a dual port semaphore register, as follows:

Dual Port Ram Semaphore Register, DPSR

| Bit Location | | Type | Description |
|---|---|---|---|
| msb | 15 | R/W | Semaphore for Bank 3 of Dual Port Sram 3 |
| | 14 | R/W | Semaphore for Bank 2 of Dual Port Sram 3 |
| | 13 | R/W | Semaphore for Bank 1 of Dual Port Sram 3 |
| | 12 | R/W | Semaphore for Bank 0 of Dual Port Sram 3 |
| | 11 | R/W | Semaphore for Bank 3 of Dual Port Sram 2 |
| | 10 | R/W | Semaphore for Bank 2 of Dual Port Sram 2 |
| | 09 | R/W | Semaphore for Bank 1 of Dual Port Sram 2 |
| | 08 | R/W | Semaphore for Bank 0 of Dual Port Sram 2 |
| | 07 | R/W | Semaphore for Bank 3 of Dual Port Sram 1 |
| | 06 | R/W | Semaphore for Bank 2 of Dual Port Sram 1 |
| | 05 | R/W | Semaphore for Bank 1 of Dual Port Sram 1 |
| | 04 | R/W | Semaphore for Bank 0 of Dual Port Sram 1 |
| | 03 | R/W | Semaphore for Bank 3 of Dual Port Sram 0 |
| | 02 | R/W | Semaphore for Bank 2 of Dual Port Sram 0 |
| | 01 | R/W | Semaphore for Bank 1 of Dual Port Sram 0 |

-continued

| Bit Location | Type | Description |
|---|---|---|
| 00 | R/W | Semaphore for Bank 0 of Dual Port Sram 0 |

RO: Read Only
R/W: Read Write Access, Reset = Low
R/WC: Read/Write high to clear. Sets on falling edge of flag

| Semaphore Action Sequence | |
|---|---|
| Action | Operation |
| Read Low | Verify Availability of Semaphore |
| Write High | Request Ownership of Semaphore |
| Read High | Verify Ownership of Semaphore |
| Write Low | Release the Semaphore |

Referring further to FIG. 15, the read/write operation is initiated at a block 340 and then proceeds to a block 342. At block 342, the ownership of the semaphore is verified. The program proceeds to a block 344 to determine if the requestor is the owner of the semaphore. If not, the program will flow along the "N" path to a block 346 to request the semaphore and back to the input of block 344. When ownership is determined, the program will flow to function block 348 to perform the operation, either a Read or a Write operation, and then to a block 350 to release the semaphore and then to an END block 352.

Figure 16:
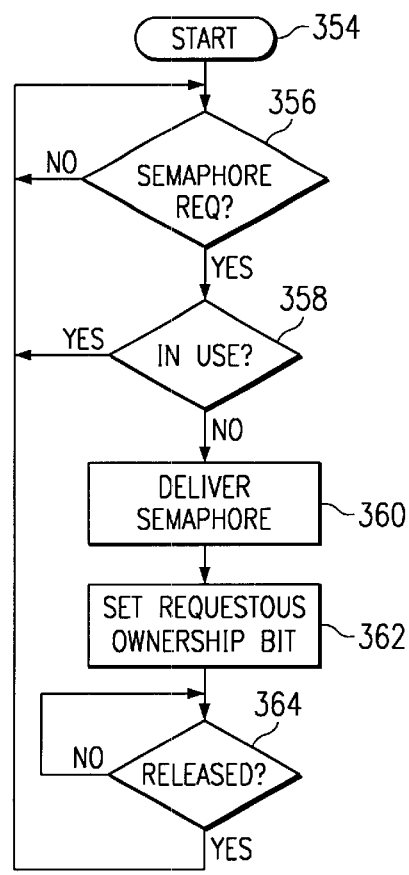

Referring now to FIG. 16, there is illustrated a flow chart for depicting the semaphore control, which is initiated at a block 354 and then proceeds to a decision block 356 to determine if the semaphore has been requested. Until a request has been lodged, the program will flow back to the input thereof. Once a request has been lodged, the program will flow to a decision block 358 to determine if the semaphore is in use. If in use, the program will flow back to the input of decision block 358. Once it is determined to be free, the program will flow from decision block 358 to a function block 360 to deliver the semaphore and then to a function block 362 in order to set the requestor's ownership bit. The program will then flow to a decision block 364 to determine if the semaphore has been released. Until it released, the program will loop back to the input of decision block 364 and, once released, the program will flow back to the input of decision block 356.

Figure 17:
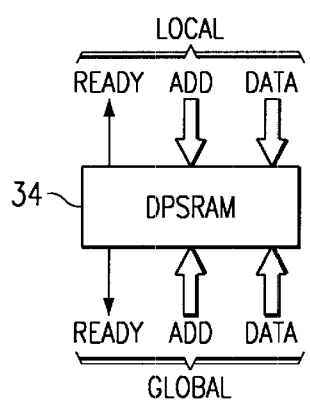
FIG. 17 illustrates a diagrammatic view of an alternate memory access technique.

Referring now FIG. 16, there is illustrated a block diagram of the DPSRAM 34 illustrating an alternate method for accessing the DPSRAM 34 for transfer of data thereto and retrieval of data therefrom. With the use of the semaphore operation, there are multiple cycles that are required. In general, this is a four cycle operation which requires the semaphore to be queried and the grant followed by the write operation and then the release operation. However, this is only acceptable for large blocks, as the transfer of small blocks of data by this technique will result in a relatively large amount of overhead as a percentage of the operation. Alternately, as illustrated in the block diagram of FIG. 17, the accessing side of the DPSRAM 34 can directly access the DPSRAM 34 without making a determination as to whether it actually has exclusive access to this resource on the global bus. As described hereinabove, the only detriment to this type of access is that there may be a situation wherein one side tries to access a cell that the other side is writing to . In this situation, there will be a "collision" which will be dealt with by the DPSRAM 34. The DPSRAM 34 will lock out a request to access by the other side when one side is actually writing to the local or the similar situation with the read operation. The DPSRAM 34 will only provide the Ready signal to the appropriate resource whenever the other side is not accessing that particular cell. Therefore, when either the CPU 20 or a global resource attempts to access a DPSRAM 34 and the other side has already accessed it, the Ready signal will not be generated for that side and they will be forced into a Wait state. For small blocks of data, this will facilitate the transfer of data in the overall system and increase throughput.

As noted hereinabove, after writing of information to the DPSRAM 34, an interrupt must then be generated to the other side to indicate that data is present for a read operation. To facilitate this, mail boxes are provided. These mailboxes allow information to be transmitted in the form of control or command information to the other side. The other side will have logic associated therewith for generating an interrupt whenever information is in the mailbox to be read and then the receiving side will service that interrupt in a conventional manner to recognize that it is required to read the contents of the mailbox. This will indicate that there is information there to be read. With respect to this mailbox, many blocks of data can be stored in the DPSRAM 34. It is only important that the receiving side know what data is to be read. It could, of course, merely read all of the contents and compare them with the previous data transfer. However, it is anticipated that the mailbox will be utilized to store the actual location of the data that is to be read or the block size that is to be read. Any information about the data stored therein as to location or size can be contained within the mailbox and transferred thereto by the transmitting side.

Figure 18:
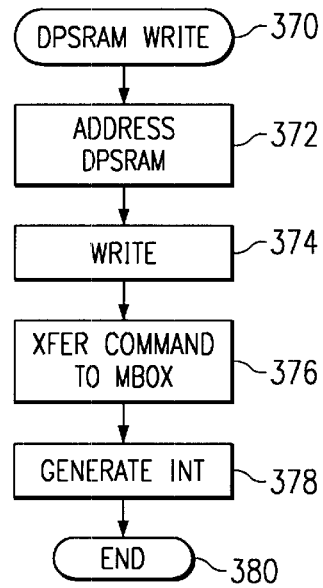
FIG. 18 illustrates a flow chart depicting the operation of the embodiment of FIG. 17.

Referring now to FIG. 18, there is illustrated a flow chart depicting the operation of writing information to the DPSRAM 34 and generating an interrupt therefrom. The program is initiated at a block 370 for a Write operation and then proceeds to a block 372 to address the DPSRAM 34, this assuming it already has access thereto through ownership of the semaphore. The program will then flow to a function block 374 to write the information thereto and then to a function block 376 to transfer the command information to the mailbox. Once this command information is stored in the mailbox, an interrupt will be generated, as indicated by a function block 378. The program then flows to an End block 380.

In an alternate embodiment of the present invention, a block counter is utilized. In this operation a counter value is stored in a register (not shown) which is operable to store an initial count value and decrement this count value for each block stored in the DPSRAM 34. Once all data has been transferred to the DPSRAM 34, the interrupt will be generated. This operation is described in the flow chart of FIG. 19.

Figure 19:
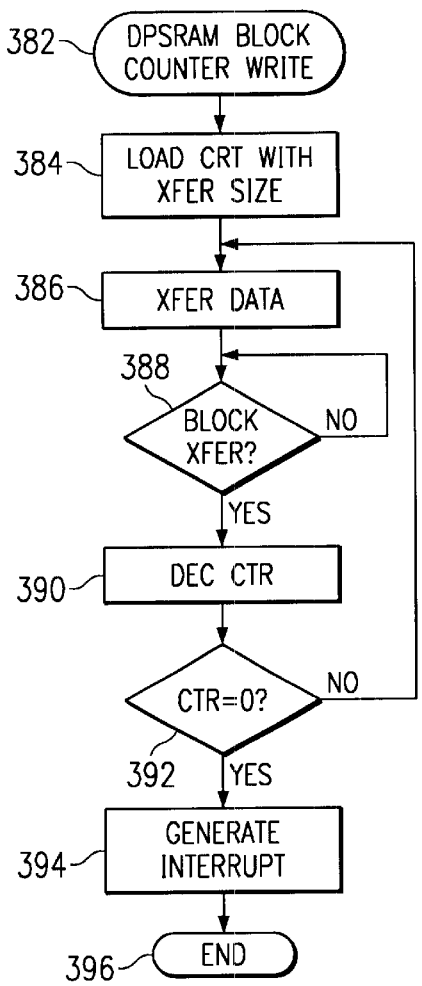
FIG. 19 illustrates a flow chart depicting an alternate access technique utilizing a block counter.

In the flow chart of FIG. 19, the program is initiated in a block 382 and then proceeds to a function block 384 in order to load the block counter with the transfer size that is to transferred from the transmitting side, this being the blocks to be transmitted. The program will then flow to a function block 386 to transfer data thereto in the form of blocks. The program flows to a decision block 388 to determine if a block has been transferred. Once the data has been transferred, the program will flow to a function block 390 to decrement the counter value and then to a decision block 392. Decision block 392 determines if the count value is set equal to zero. If not, the program will loop back around to the input of function block 386. Once the count value is set equal to zero, indicating that all data have been transferred thereto, the program will flow to a function block 394 in order to generate the interrupt to the receiving side and then to an End block 396. With the system utilizing the block counter, large data transfer operations can be performed with multiple data without requiring an interrupt to be generated via the mailbox operation.

Paging Operation

Figure 20:
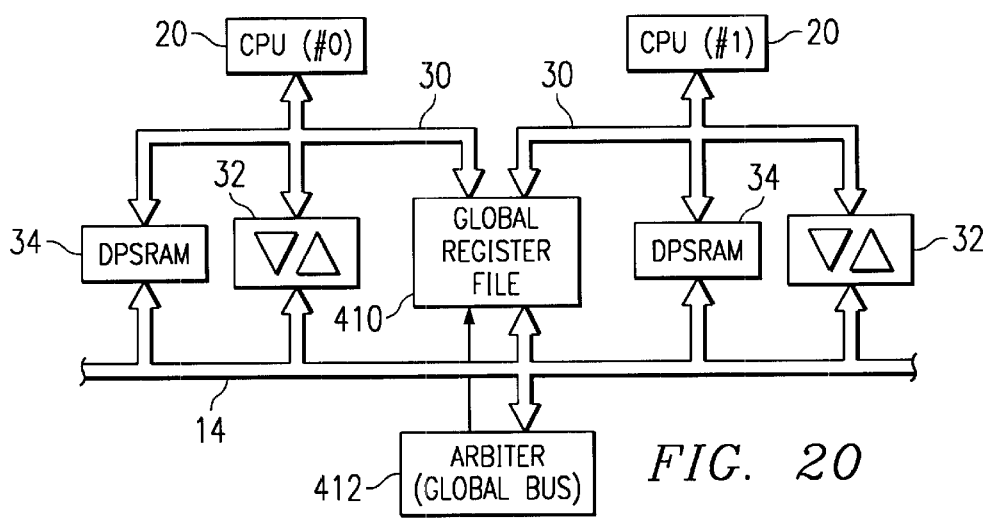
FIG. 20 illustrates a block diagram of the system illustrating the paging feature.

Referring now to FIG. 20, there is illustrated a block diagram of two CPUs 20 associated with two processor nodes 10, which interface with a global register file 410. The global register file 410 contains registers that are to be associated with a common function and also to provide an output to the global bus 14. For the paging operation described hereinabove, the global register file 410 contains a global register (not shown) for each processor node 10 and for each associated CPU 20. A global bus arbiter 412 is provided which is interfaced with the global bus 14. The arbiter 412 operates conventionally in that it determines what global resource has access to the global bus 14 at any time. This is a conventional operation. The arbiter 412 will control the global register file 410 and allow any portion thereof to have access to the global bus 14.

As will be described hereinbelow, each CPU 20, when acting as a bus master, can generate an address within its 4 Mbytes of local address space and, with the use of the its associated paging register, it can add the upper bits required to address the much larger, 4 Gbytes, address space for the global bus 14. However, the difficulty in performing this operation is that intermediate bus 30 cannot carry a large enough address for output to the global bus 14.

Figure 21:
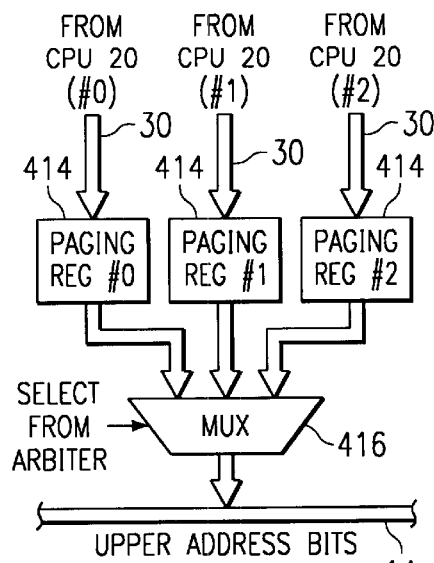
FIG. 21 illustrates a more detailed block diagram of the paging registers and how they are multiplexed to the global bus.
Figure 22:
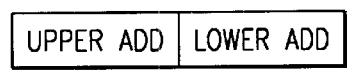
FIG. 22 illustrates a diagrammatic view of the generated paging address.

Referring now to FIG. 21, there is illustrated a block diagram of the global register file 410 which is associated with the paging operation. A paging register 314 is associated with each of the CPUs 20 at each of the processor nodes 10, only three being illustrated in FIG. 21. Each paging register 314 is interfaced with the CPU 20 through the intermediate bus 30. The CPU 20, when desiring to access the global bus 14, will generate a paging address for storage in its associated paging register 314. As described hereinabove, twelve bits of the register contain the paging field which is then combined with the CPU 20 buffered address to form the 33-bit global bus address. After the particular CPU 20 for a given one of the processor nodes 10 is granted access to the bus and constitutes the bus master, a multiplexer 316 then selects from the output of one of the paging registers 414 for output to the global address bus 14 as the upper twelve bits of the global bus 14 address. The multiplexer 316 is controlled by the arbiter 412. This is illustrated in FIG. 22.

In operation, the paging method allows for a plurality of processors to share a common memory space, the global address space, with each other, while retaining some local address space for local resources. In FIG. 3, for example, it was noted that each processor has associated therewith a memory space divided into two memory spaces, the local memory space 21 and the global memory space 23. The local memory space 21 is a memory space that is associated with memory on the local bus or intermediate bus 30 which is utilized for the various local resources associated with that particular CPU 20. Therefore, the CPU 20 having only 4 MB of addressability has that addressable space divided into two segments, a first segment associated with the local resources and accessible only by that CPU 20 and the other addressable space, the addressable space 23, associated with the shared resources on the global side. If any CPU 20 wants to access a particular segment of the global address space in a particular page in the global address space, it need only generate the particular paging address. However, since the global address space is shared by all processor cores 10, this means each processor core 10 has the ability to, through its CPU 20, address this common global address space in any segment in any page. For example, if a register location was required for the operation of a CPU 20 and this register location were disposed in the global address space, there would have to be another level of inhibit logic utilized in the software to prohibit other CPUs 20 from accessing that register. Therefore, the system of the present invention has core resources distributed among the CPUs, which core resources do not occupy any portion of the address space of the other CPUs 20. It is noted that, even though the DPSRAM 34 may be accessible as a global resource within the global address space by another CPU 20, the DPSRAM 34 is configured such that there is a global side and a local side wherein the local side occupies a portion of the local address space and the global side occupies a portion of the global address space. Although there is no reason for any CPU 20 to access its own DPSRAM 34, it is possible through the paging scheme to actually enter the address for the global side of the DPSRAM 34 associated with the addressing CPU 20 since it does occupy a portion of the global address space. However, the address for addressing the global side of the DPSRAM 34 is different than the address on the local side, as the global address occupies the portion 23 and the local side occupies the portion 21 of the local address space for the local bus or intermediate bus 30. In effect, therefore, the DPSRAM 34 would actually occupy two portions of the local address space within a given processor core, it being recognized that a paging address must also be generated in addition to the lower portion of the address being generated in the portion 23.

Processor Intercommunication Network

Figure 23:
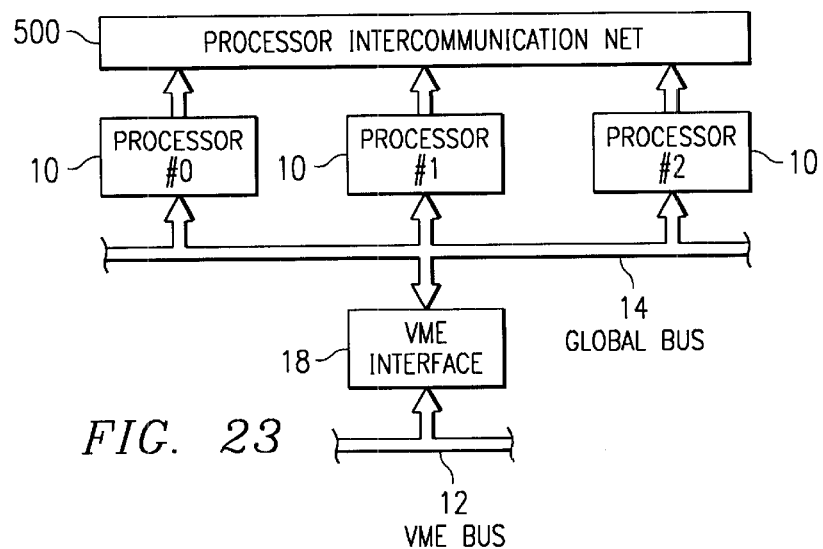
FIG. 23 illustrates a general block diagram for a multiple processor system utilizing a processor interconnection network separated from the global bus.

Referring now to FIG. 23, there is illustrated a block diagram of the processor interconnection network for connecting between various of the processor cores 10. As described hereinabove with reference to FIG. 1, each of the processor cores 10 is operable to interface with the global bus 14 and, through the global bus 14, with the various global resources. However, in order for one processor core 10 to communicate with another processor core 10 through the global bus, it is necessary to go through the global resources. The inter communication network of the present embodiment alleviates the need to use he global resources for communicating between processors. Each of the processor cores 10 includes the CPU 20, which CPU 20 has the ability to communicate on its own local bus 22 through the associated intermediate bus 30. This provides a separate path which can be routed to a processor intercommunication network 500, which is connected to each of the processor cores 10 through its associated intermediate bus 30. As will described hereinbelow, each of the processor cores 10 has contained therein interface circuitry for allowing it to interface through the processor communication network 560.

Figure 24:
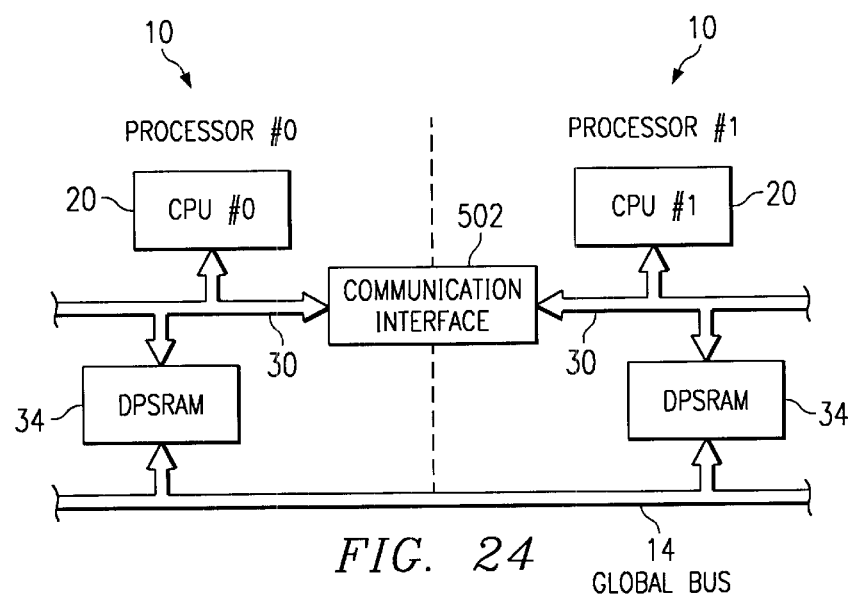
FIG. 24 illustrates the detail of the communication interface port to a processor.

Referring now FIG. 24, there is illustrated a more detailed block diagram of the communication interface between processor cores 10. In FIG. 24, only the CPU 20 is illustrated for two of the processor cores 10 and is shown directly connected its intermediate bus 30, it being noted that there is a buffer 32 which interfaces between the local bus 22 and the intermediate bus 30 that is not shown. Also, it can be seen that each of the CPUs 20 can interface with the global bus 14 through the DPSRAM 34 associated therewith. In order to allow each of the CPUs 20 to directly communicate with another CPU 20, a communication interface 502 is provided between the processor cores 10. The intermediate bus 30 for a given CPU 20 directly communicates with the communication interface 502. Therefore, whenever the CPU 20 in #0 processor core 10 desires to communicate the information to a CPU 20 in #1 processor core 10 it will then transfer data to communication interface 502 through its intermediate bus 30 which will then be extracted from the communication interface 502 by the CPU 20 and #1 processor core 10 via its intermediate bus 30. This communication interface 502, as will be described hereinbelow, is a bi-directional storage device in the form of a FIFO. This is represented by the Bi-FIFO 38 in FIG. 2.

Figure 25:
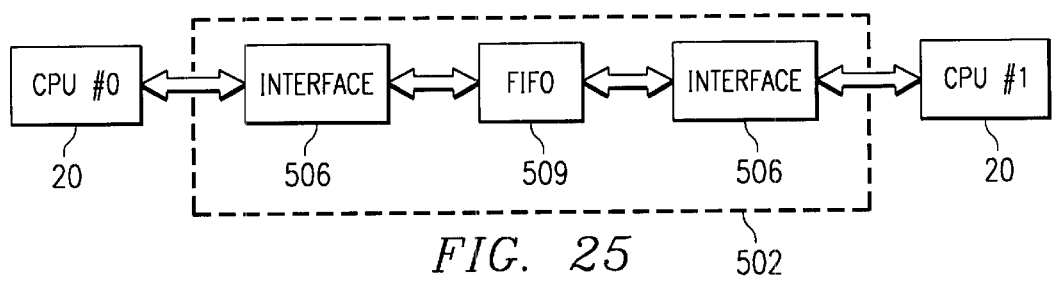
FIG. 25 illustrates a detail of the interface between the two processors.

Referring now to FIG. 25, there is illustrated a simplified diagrammatic view of the manner in which each of the CPUs 20 communicates with each other through the communication interface 502. Each of the CPUs 20 has the ability to communicate with a memory device. In the particular CPU 20 utilized in the above described embodiment, it has the ability to communicate with SDRAM, SBSRAM and Asynchronous memory. However, dual port versions of these memories may not be available and it may be that the other CPU 20 that it is communicating with does not have access to this type of memory, such that a common dual port structure is not available. Therefore, a bi-directional FIFO 504 is utilized with an interface 506 provided on each side of the FIFO 504 to allow the associated CPUs 20 to interface therewith. These interfaces 506 basically emulate the type of memory that can interface with the CPU 20 such that the FIFO 504 appears to each of the CPUs 20 as the particular memory that it can interface with. Further, as will be described hereinbelow, each of the CPUs 20 can interface with three different types of memory and the interface 506 is operable to selectively re-define the interface between the CPU 20 and its side of the FIFO 504.

Figure 2:
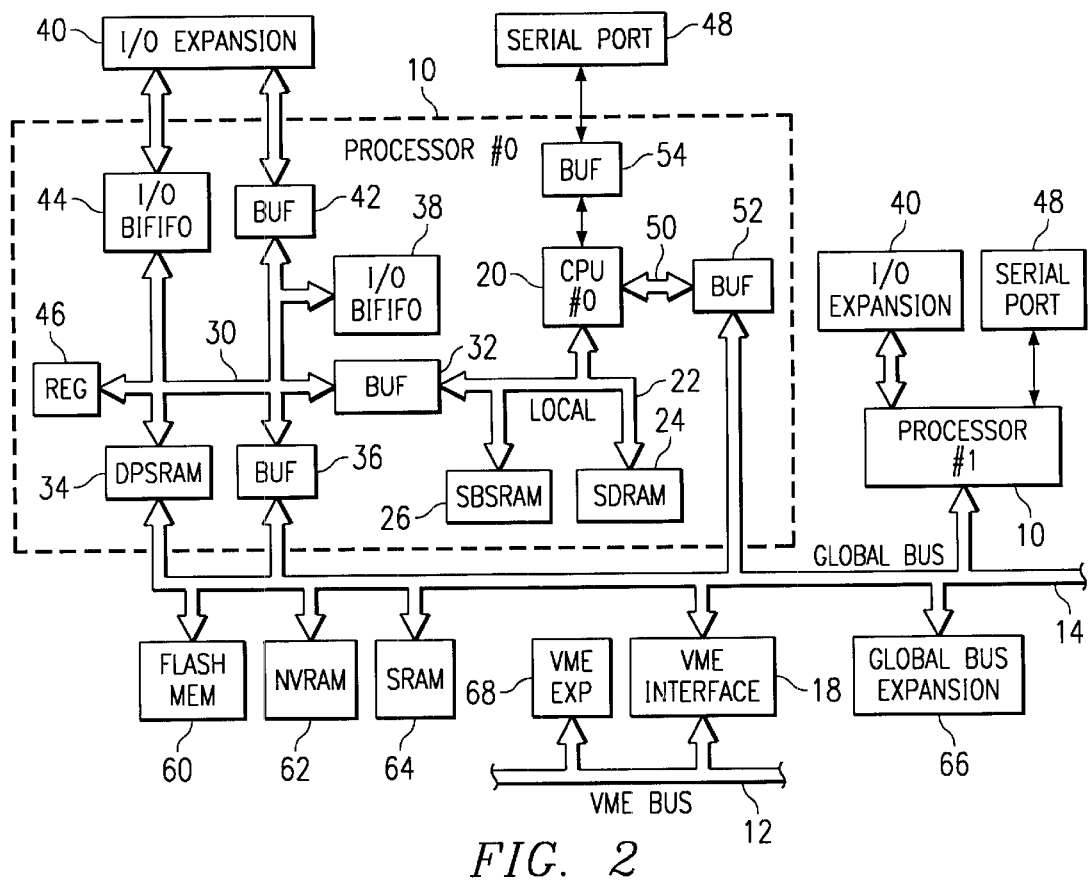
FIG. 2 illustrates a more detailed block diagram of the multi-processor system of FIG. 1 detailing the processor section.

As described hereinabove, each of the processor cores 10 is provided a number of interfaces, there being three bi-directional FIFO (Bi-FIFO) interfaces. One of these is provided by the Bi-FIFO 44 to the daughter board and two are provided by the Bi-FIFO 38 in FIG. 2. These Bi-FIFO interfaces are utilized to provide a high throughput data path between the CPUs 20 such that messages can be transferred to another CPU 20 and received from another CPU 20. The two interfaces represented by the block 38 in FIG. 2 are associated with the interprocessor communication network 500 in FIG. 23. As will be described hereinbelow, with this FIFO intercommunication structure, each CPU 20 is provided with a high throughput, deterministic data transfer mechanism that does not require arbitration or wait states. Each side of the intercommunication path can be accessed simultaneously yielding a peak concurrent Read or Write to the processor core of 800 Mbyte/s (SBSRAM). Due to timing limitations of the CPU 20, the structure can be accessed with either SBSRAM timing or with Asynchronous memory timing. In order to maximize the throughput of the structure, a switched-bank architecture is employed. Utilizing the architecture on-the-fly decoding is eliminated and peak throughput is achieved. The structure additionally supports messaging between processor cores 10 and through each processor core 10 and its expansion site through a bi-directional mailbox facility, which is connected into the interrupt structure of the CPU 20. Various flags and status bits are provided to effectively throttle data transfers through the structure.

Figure 26:
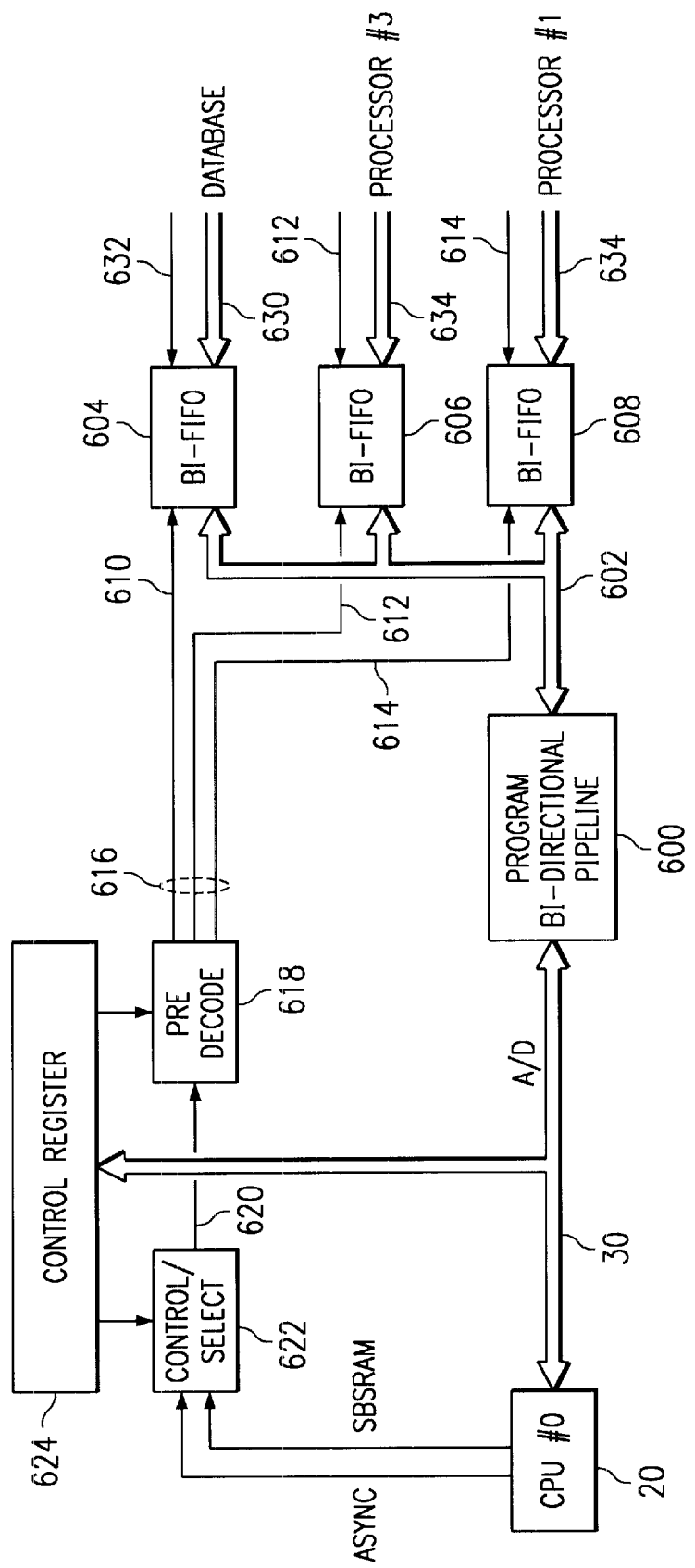
FIG. 26 illustrates a block diagram of the interface for once processor.

Referring now to FIG. 26, there is illustrated a block diagram of the interconnection provided by the FIFO 48 and the FIFO 38 in FIG. 2. The block diagram is simplistic in that it illustrates only the structure necessary to perform the interprocessor communication and the communication with the daughter board. The CPU 20, interfaced with the intermediate bus 32 provides address and data information thereon. This is input to a programmable bi-directional pipeline block 600, which is operable to transfer data in a block transfer mode to a local communication bus 602. The local communication bus 602 is interfaced with three Bi-FIFOs, a Bi-FIFO 604 corresponding to the Bi-FIFO 44 in FIG. 2, a Bi-FIFO 606 and a Bi-FIFO 608, Bi-FIFOs 606 and 608 corresponding to the Bi-FIFO 38 in FIG. 2. The Bi-FIFO 608 also receives timing and control information on associated lines 610, 612 and 614, these being referred to collectively as select lines 616, these providing the necessary timing information and selection lines to control data transfer to and from the Bi-FIFOs 604–608. The select lines 616 are output from a pre-decode block 618 which is a multiplexer which is operable to multiplex timing and control information on a line 620 for connection to one of the lines 610–614. These control signals are generated by a control/select circuit 622, which control/select circuit 622 receives timing information from the CPU 20. The CPU 20, as noted hereinabove, is operable to interface with a number of different memories. It can interface with an SBSRAM, an SDRAM and an Asynchronous memory. Therefore, the CPU 20 provides control signals for output therefrom to these particular memories. When interfacing with the Bi-FIFOs 604–608, it is necessary to generate the timing information for one of the Bi-FIFOs after converting the timing information, for example, in the SBSRAM selection, such that they will be compatible. As such, the control/select block 622 will "emulate" an SBSRAM timing signal for interface to the Bi-FIFO 604–608.

In order to determine which of the Bi-FIFOs 604–608 are written to, a control register 624 is provided which is interfaced with the address/data bus 30, the intermediate bus, to allow information to be stored therein, this control register 624 existing within the address space of the CPU 20. Therefore, a control word can be stored in the control register 624, which control word has contained therein a number of bits that are directed toward the pre-decode block 618. In the illustrated embodiment, only two bits are required in order to select one of the three device select lines 616. However, there could be multiple bits required. Therefore, whenever the control word is stored in control register 624, those two bits will be hard-wired to pre-decode block 618 such that the appropriate lines are selected and the timing and control information on line 620 routed the appropriate Bi-FIFO 604–608. This basically eliminates the need for an on-the-fly decode operation. Once the decode has been selected, the CPU 20 can then perform block transfer of data through the selected one of the e Bi-FIFOs 604–608. Is should be understood that this increases the data transfer rate in that it is not necessary to load the control register 624 for each data word transferred on the data bus 30 to the selected Bi-FIFO. This, of course, is consistent with the operation of an SBSRAM. In the illustrated embodiment, the CPU 20 operates at a rate of 200 Mhz wherein the Bi-FIFOs 604–608 can operate at a rate of 100 Mhz. Each of these is configured as a 2×1K×32 structure.

The Bi-FIFO 606 is connected to CPU 20 for the #3 processor core 10. The is facilitated through the associated local intercommunication bus 634 for that processor core 10 and it also has associated therewith control lines. These mirror the control lines on the other side associated with the #0 processor core 10. The Bi-FIFO 604, on the other hand, interfaces with a daughter board which will have associated therewith its own intercommunication bus 630 and control lines 632. Since this is a FIFO structure, each processor core can selectively extract the data therefrom in the order in which it was stored. This requires an interrupt to be generated after the data is stored or buffered therein. It is important to note that all three of the Bi-FIFOs 604–608 exits within the same memory space. This is due to the fact that a pre-decode operation is utilized. These Bi-FIFOs select bits are contained in the Miscellaneous Control Register 0, MCR0, of each processor, this being the control register 624. The select lines 610–614 control data transfer operations and also mailbox functionality provided in the intercommunication network. During a reset operation, these bits are set to zero establishing one of the interprocessor communication paths. These are set forth in Table 3.0, as follows:

TABLE 3.0

| MCR0 Bit Position to Reset Function Mapping | |
|---|---|
| MRCO Bit Position | Bi-FIFO Path Reset |
| 12 | Bi-FIFO Path ZZ |
| 11 | Bi-FIFO Path XX |
| 10 | Daughterboard I/O Bi-FIFO |

By difinition, the CPU 20 is always connected to one of the three attached Bi-FIFOs 604–608. By eliminating the delays associated with one-the-fly decode, such that only one decode is required for a block transfer, data transfer can occur at slower of the two SBSRAM timing rates (100 Mhz @ 200 Mhz CPU rate). Due to varying system requirements, the timing of the structure may be changed between asynchronous and SBSRAM timing.

Each of the Bi-FIFOs 604–608 define a path, which path must be individually reset under software control. Reset of the paths is accomplished through the setting and clearing of the Bi-FIFO bits contained within MCRO (bits 12–10). If a bit is set but not cleared, the Bi-FIFO will be held and reset. It is noted that the Bi-FIFOs are not reset when the board is reset; however, as part of the board initialization, the boot code will reset the Bi-FIFO paths. Table 4.0 specifies each processor physical connections for the XX and ZZ connection paths. Each CPU 20 will be connected to either the A side or the B side of each Bi-FIFO. Reset Bi-FIFO initialization occurs from the A side of the interface. Table 5.0 specifies for each CPU 20 which paths are to be reset and initialized by each CPU 20. All CPUs 20 are attached to the A side of the I/O Bi-FIFO and will be responsible for its reset and initialization. It is noted that the Bi-FIFO reset is not effected by the Bi-FIFO select bits.

TABLE 4.0

| Interprocessor Connection Table | | |
|---|---|---|
| Processor # | XX Path | ZZ Path |
| 0 | 0–1 | 3–0 |
| 1 | 1–2 | 0–1 |
| 2 | 2–3 | 1–2 |
| 3 | 3–0 | 2–3 |

TABLE 5.0

Bi-FIFO Select Due to Bi-FIFO Path Mapping & Reset Assignments

| FIFO Select (S1, 50) | CPU #0 Bi-FIFO Path Selected | CPU #1 Bi-FIFO Path Selected | CPU #2 Bi-FIFO Path Selected | CPU #3 Bi-FIFO Path Selected |
|---|---|---|---|---|
| 0, 0 | CPU #0 to CPU #1 (R) | CPU #1 to CPU #2 (R) | CPU #2 to CPU #3 | CPU #3 to CPU #0 |
| 0, 1 | CPU #0 to CPU #3 (R) | CPU #1 to CPU #0 | CPU #2 to CPU #1 | CPU #3 to CPU #2 (R) |
| 1, x | I/O Expansion (R) | I/O Expansion (r) | I/O Expansion (r) | I/O Expansion (R) |

After the BI-FIFO is reset, the programmable flag levels need to initialized. This is accomplished through the first four Writes to the A-side of which is the same side of the Bi-FIFO responsible for its reset illustrated in Table 3.0. Even if the flags are not utilized, four dummy Writes must occur before data transfer, as the four Writes to the A-side of the Bi-FIFO will always be loaded into these registers. The binary representation of the almost empty and almost full levels is presented by the CPU 20 on the lowest eight bits of the data bus (D9–D0). D9 is the most significant of a binary number. The registers are loaded in the following order: (1) Y1, Port A Almost Full Level (2) X1, Port B Almost Empty Level (3) Y2, Port B Almost Full Level (4) X2, Port A Almost Empty Level. The valid programming ranges for the registers range from 1–1020 (decimal). A port's almost empty flag pertains to its incoming FIFO and a port's almost full flag pertains to the out going FIFO. After the first four Writes that establish the level values, the structure is now ready to accept data. Because the data path is exercised during te programming of the flag levels, data transfer falls under the control of the Bi-FIFO select lines. Any address within the Bi-FIFO address space (with the exception of mailbox space) is valid for the initialization.

Data transfer to and from the FIFOs and the Mailbox logic contained within the Bi-FIFOs are handled under the control of the Bi-FIFO select bits contained within MCRO. While the reset of the Bi-FIFOS occurs independent of the state of the select bits, all other operations are controlled by the select bits. As the CPU 20 is always logically connected to one of the three Bi-FIFO paths, one must exercise care in knowing the state of the select lines as a Read or Write operation will always complete, but the select bits contained within MCRO determine the source or destination. A single Write to MCRO is all that is required to change the state of the select line, and thereby select another Bi-FIFO path for access thereof.

Once the select bits have been programmed in MCRO, the CPU 20 is free to transfer data with the selected Bi-FIFO. To read or write data with the Bi-FIFO, it is only necessary to access any long word address within the FIFO memory space 0x0100 0000-0x01FF FFFC contained within CE1 of the CPU 20. Reads will always occur from the inbound FIFO and Writes will occur to the outbound FIFO. By having the Bi-FIFO exist at a multiple memory locations, one can utilize the auto-increment feature of the DMA controller for transfers. Transfers between the CPU 20 and the mailbox facilities operate in a similar manner. Any access to any long word address in the CPU's Bi-FIFO mailbox address space, 0x0200 0000-0x02FF FFFC will perform a data transfer to the mailbox facilities. All Writes to the mailbox address space will send data to the opposite side of the Bi-FIFO and set the mailbox flag, and all Reads will read the incoming mailbox and reset the local mailbox flag.

Figure 27:
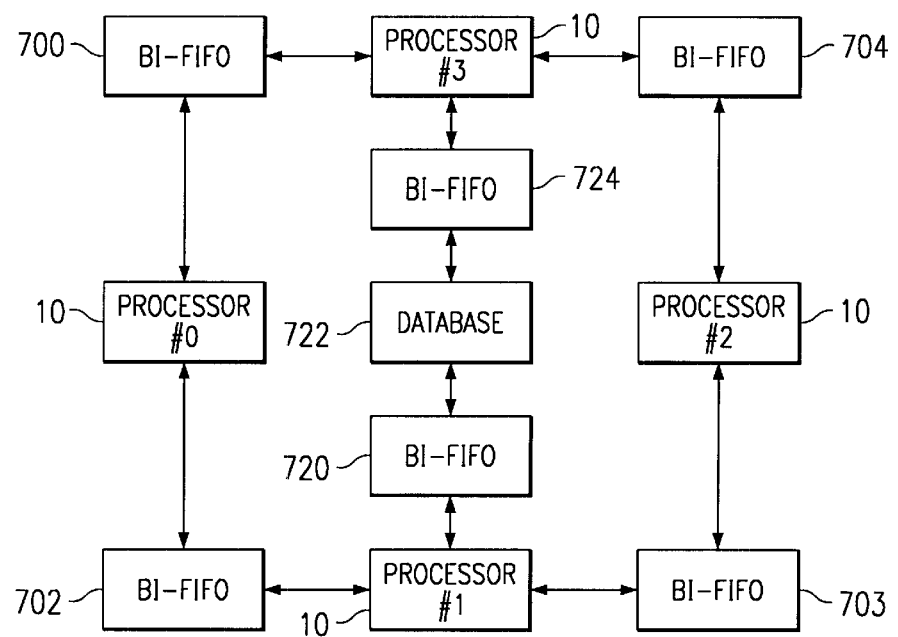
FIG. 27 illustrates a diagrammatic view of the architecture for interconnecting four processor cores.

Referring now to FIG. 27, there is illustrated a diagrammatic view of the interconnection of four processor cores 10 with the Bi-FIFO structure. Each of the processor cores 10 contain one of the Bi-FIFO necessary for intercommunication with each other. However, they will be illustrated as being external. The processor cores 10 are labeled #0–#3. The #0 processor core 10 is connected to a Bi-FIFO 700 and a Bi-FIFO 702. The #1 processor core 10 is interconnected to Bi-FIFO 702 to create a path with #0 processor core 10 and also to a Bi-FIFO 703. The #2 processor core 10 is interfaced with the Bi-FIFO 703 to provide an intercommunication path with the #1 processor core 10 and also with a Bi-FIFO 704. The #3 processor core 10 is interfaced with the Bi-FIFO 700 to create an intercommunication path with the #0 processor core 10 and also with the Bi-FIFO 704 to create an intercommunication path with the #2 processor core 10. Therefore, each of the processor cores 10 must have the path defined such that it is aware of which processor core 10 it is communicating with.

In addition, the additional Bi-FIFOs 44 in FIG. 2 and 604 in FIG. 26 are represented external to the #3 processor core 10 and the #1 processor core 10. The #1 processor core 10 is interfaced with a Bi-FIFO 720 to allow intercommunication to a daughterboard 722. The daughterboard 722 also interfaces with the #3 processor core 10 through a Bi-FIFO 724. Therefore, for example, the #1 processor core 10 can communicate with the #0 processor core 10, the #2 processor core 10 and also the daughterboard 722. It is important to note that each of the Bi-FIFOs 702, 703 and 720 exist within the same address space such that the pre-decode is required. As described hereinabove, this pre-decode operation is achieved in one cycle and thereafter the data is transferred to the destination device.

Figure 28:
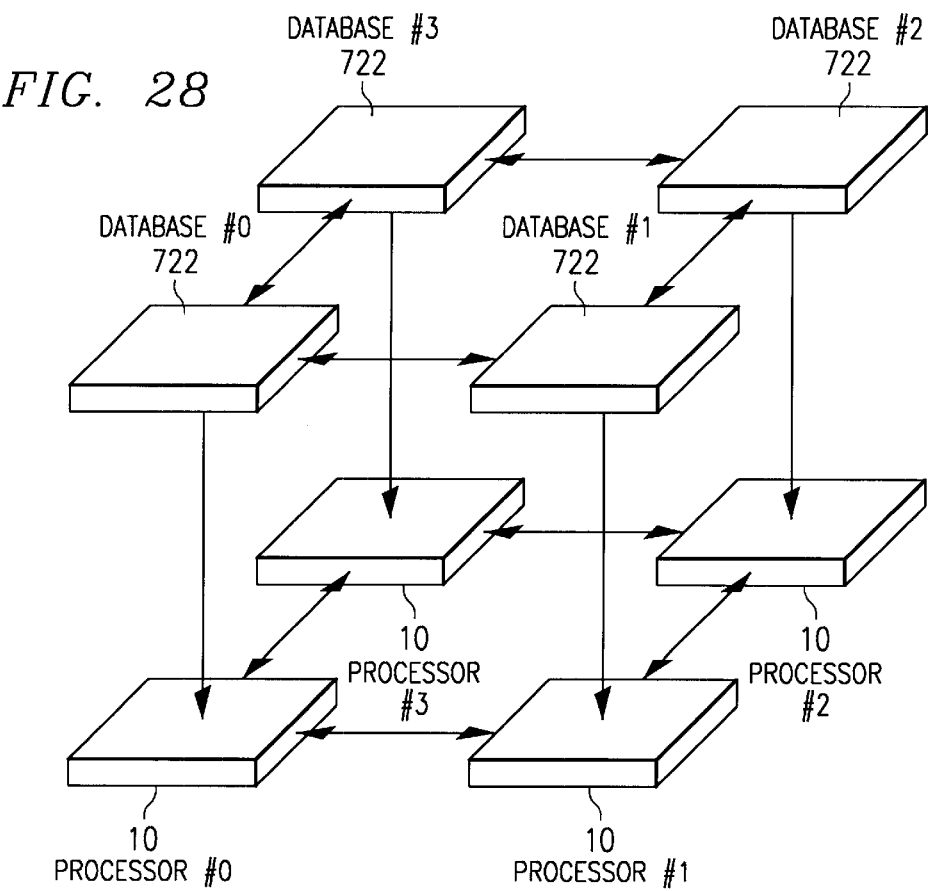
FIG. 28 illustrates a diagrammatic view of interconnection of four processor cores and another plane of daughter boards.

Referring now to FIG. 28, there is illustrated a diagrammatic view of how multiple processor cores 10 are interfaced with multiple daughterboards. Each of the processor cores 10 labeled #0–#3 are interfaced with the corresponding daughterboard DB#0–DB#2, labeled with reference to daughterboard 722. The interconnection paths are represented by lines indicating that there is a Bi-FIFO at one of either the processor cores 10 or the daughterboards 722. Each of the processor cores 10 is described with reference to FIG. 27 and each of the daughterboards 722 is connected such that daughterboard DB#0 is interfaced with the daughterboard DB#3 and DB#1, and daughterboard DB#2 is interfaced with daughterboards DB#3 and DB#1. This allows the daughterboards 722 to interface with each other similar to the processor cores 10. Although not shown, each of the daughterboards 722 contain a similar processor structure wherein each of the CPUs 20 have an intermediate bus. Each CPU 20 associated with each of the daughterboards 722 have a local bus and an intermediate bus with associated memory and they have an intercommunication Bi-FIFO similar to Bi-FIFO 606 and 608 of FIG. 26.

Figure 29B:
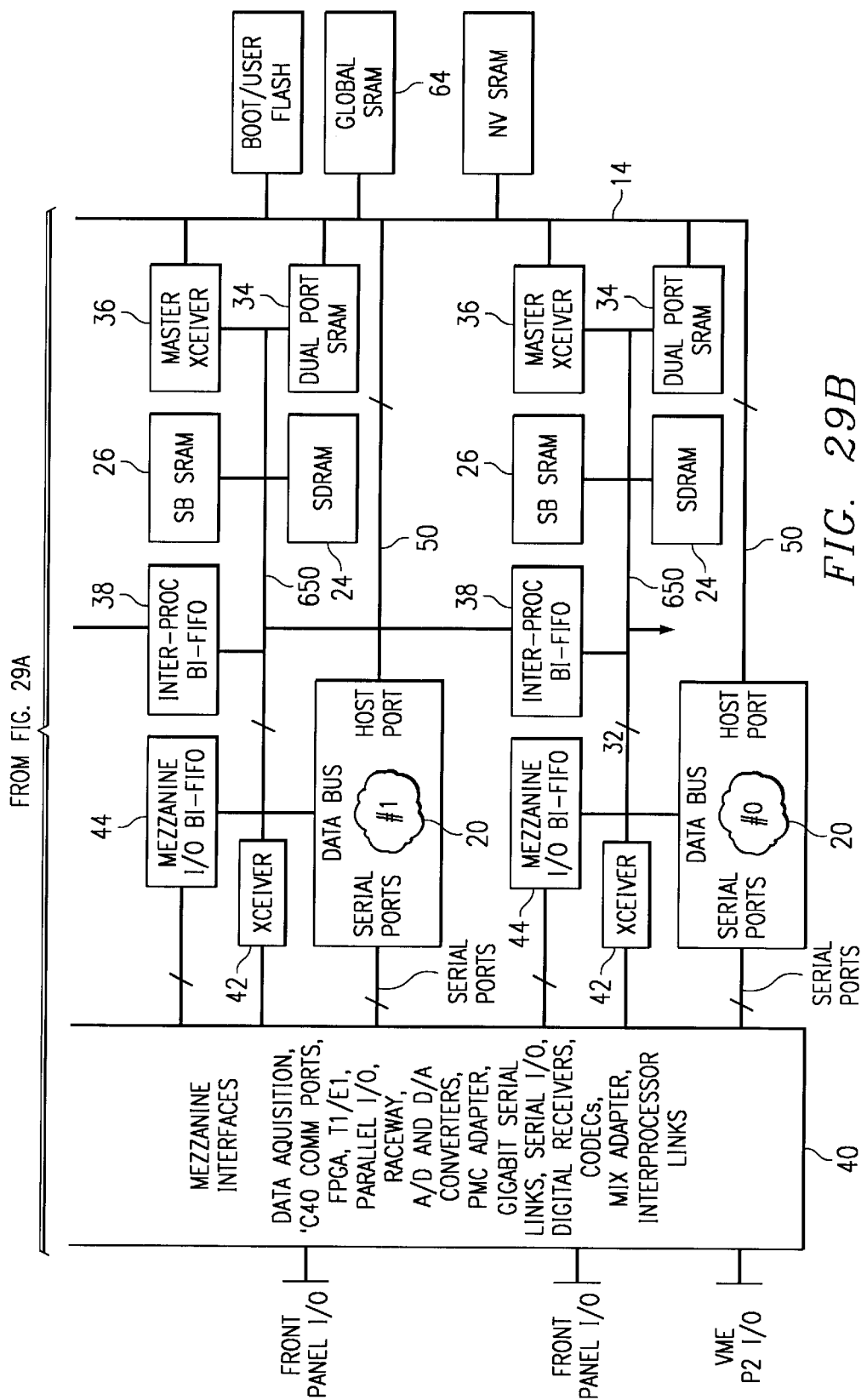

Referring now to FIGS. 29A–29B, there is illustrated a block diagram of the layout of a given board which includes three core processors 10. Each of these has associated therewith a CPU 20 and appropriate memory, Bi-FIFOs and DPSRAM 34. As noted hereinabove, each of the CPUs 20 has the ability to access the global bus 14 through its DPSRAM 34 for transfer of data to and from the global resources. However, direct communication between the CPUs 20 is not facilitated through this method. This is due to the fact that data must first be stored in the global storage space and then retreived therefrom by the receiving CPU 20. This all must be facilitated through a shared memory space and through a shared bus sysytem. Therefore, as noted hereinabove, the interprocessor communication is facilitated through the Bi-FIFO 38.

In the embodiment of FIGS. 29A–29B, the board is configured such that CPU 20 associated with the #0 processor core 10 is interfaced through the combined intermediate bus 30 and local bus 32 with reference numeral 650, to both the Bi-FIFO associated with #0 processor core 10 and also with the Bi-FIFO 38 for #3 processor 25 core 10. The other side of Bi-FIFO 38 associated with #0 processor core 10 is interfaced with the intermediate bus 650 associated with #1 processor core 10. In like fashion, the other side of the Bi-FIFO 38 associated with #1 processor core 10 is interfaced with bus 650 for #2 processor core 10. The other side of Bi-FIFO 38 for #2 processor core 10 is connected to bus 650 associated with #3 processor core 10.

Figure 30:
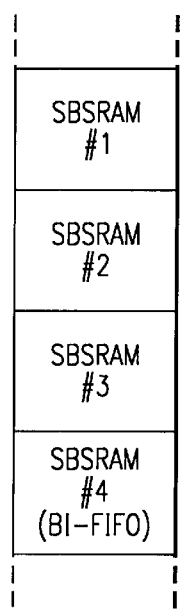
FIG. 30 illustrates a diagrammatic view of the address space of the CPU associated with the SBSRAM.
Figure 31:
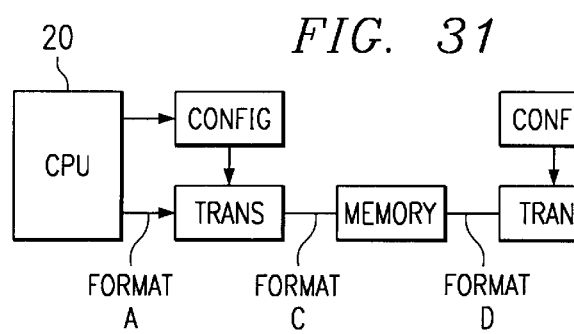
FIG. 31 illustrates a block diagram of the Bi-FIFO interprocessor communication network.

Referring now to FIG. 30, there is illustrated a diagrammatic view of a portion of the address space associated with each of the CPUs 20, which portion is defined as the space for interfacing with the external memory devices. This is the local address space, as compared to the global address space. In this portion of the address space, there are provided four areas or windows defining addressable locations for storage of data therein. Each of these windows is selected via a chip select output by the CPU 20. The only restriction to each of the windows is that it be associated with the same type of memory device. For example, a given window can be associated with SBSRAM and another with SDRAM. However, within a window, there can be multiple devices provided for through mapping facilitated with some type of pre-decode operation, bu tthese devices must be of a common type.

The CPU 20 is a defined device which has a defined interface and addressing capability. In this defined interface, the CPU 20 has the ability to accommodate up to four of the address space windows associated with SBSRAMs or other memory devices. The SBSRAM is a "pipelined" device which requires certain controls to be generated and certain addresses to be generated and data to be transferred thereto or retrieved therefrom in a certain order. In general, there are a number of control signals that the CPU 20 outputs for the SBSRAM. These are data and address, and the control signals to control the SBSRAM. These control signals are well known, and will not be described hereinbelow. However, the SBSRAM has a clock signal that is provided thereto, a data strobe and a Read/Write control, among others. The control signals also comprise an address advance and an address load signal. This allows data to be transferred in a block transfer by merely generating an address and then sequentially generating data with the address advanced for each clock cycle. In this manner, a separate random access is not required for each data word that is transferred to the SBSRAM. This is a conventional device and the important aspect is that it has a defined protocol with which data is to be transferred thereto or retrieved therefrom by the CPU 20, this protocol requiring certain control signals and the such. As has been described hereinabove and as will be further described hereinbelow, the interface 506 in FIG. 25 provides a translation feature which is defined in the bi-directional pipeline block 600 of FIG. 26. This translation allows control signals and data to be transferred from the CPU 20 in accordance with the defined protocol of the memory defined by the CPU 20 and actually interfaced to a memory with a different protocol or a different format.

In the present embodiment, a certain portion of the address space, that associated with SBSRAM #4 in the address space of FIG. 30, is defined as being associated with the Bi-FIFO 38 for the associated CPU 20 and with the BiFIFO 38 for the interconnected CPU 20 in another processor core 10, in addition to the BiFIFO 44 associated with the I/O. However, each of these devices occupies the same memory space within the window, this requiring the pre-decode operation provided by the pre-decode block 618 in FIG. 26. Whenever the appropriate chip select is generated by the CPU 20 and the appropriate pre-decode bits stored in the control register 624, one of FIFOs 604, 606 or 608 will be selected. The pre-decode will allow the hardware to select between three memory devices 604–608 and then data can be transferred thereto or retrieved therefrom in accordance with the format of an SBSRAM, in the disclosed embodiment, although other formats could be accommodated.

In the present embodiment utilizing the Bi-FIFO 38, data is transferred to a latch 670, the other side of the latch 670 interfaced to the data port of the Bi-FIFO 38. A clock signal from the CPU will clock the latch 670 and will also clock the Bi-FIFO 38 on the associated side, it being understood that this is a dual port FIFO. The address from the CPU 20 is not required for the Bi-FIFO, as the Bi-FIFO is essentially a serial device; that is, data is placed into the first available location which will then "fall through" to the last location on the other side to be read therefrom. Bi-FIFO 38 is a model no. 723642, manufactured by IDT. As such, no address is required. It is only important that data is presented to the Bi-FIFO 38 and then strobed therein. This, of course, is after the control register is written to in order to select the Bi-FIFO 38 to be read from. The data strobe is one of a plurality of control signals that are on a control line 672 output by the CPU 20. One of these is a data strobe on a line 674 which is input to a latch 676 to output a strobe signal to the Bi-FIFO 38 for both Read and Write operations. The other signal that is required for the Bi-FIFO 38 is the Read/Write signal on a line 678, which is input to a latch 675, the output thereof input to the Bi-FIFO 38. The Bi-FIFO 38 therefore receives the data in a manner that was meant to be received by an SBSRAM. The latches 670, 676 and 675 provide a pipelining feature to allow the data to be synchronized with the "streaming" data that is output to an SBSRAM. The address advance and address load and even the address information is not required in the Bi-FIFO 38 and, therefore, these are not provided thereto. The Bi-FIFO 38 also provides on lines 680 information about the Bi-FIFO 38. These indicate whether the Bi-FIFO is empty, full, almost empty or almost full. These essentially function as "flags" to indicate to the device on the other side of the Bi-FIFO 38 that data is to be extracted therefrom. These can be connected to an interrupt circuit for generating an interrupt or they can be polled periodically.

In operation, if the CPU 20 desires to transmit data to another CPU connected to the other side of its Bi-FIFO 38 or the Bi-FIFO of another CPU 20, it merely needs to access that address space and then transmit data thereto as if it was a SBSRAM. In receiving data, it merely receives an indication that data is in the Bi-FIFO 38 that it is interfaced to by an interrupt signal generated from circuitry associated with that particular Bi-FIFO 38. Once the interrupt is generated, it reads the data as if it were reading from an SBSRAM, i.e., it need only enable the device, send a Read signal thereto and then transfer the data therefrom onto the data bus associated with the CPU 20 and its local bus 22.

Figure 33:
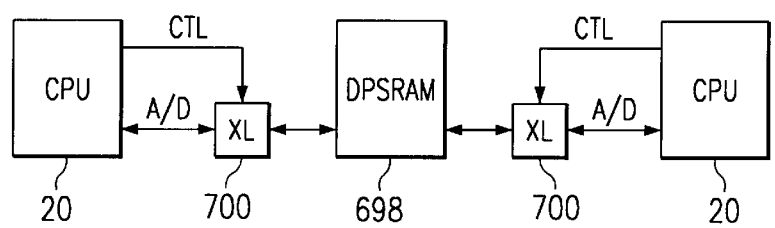
FIG. 33 illustrates an alternate embodiment of the translator circuit utilizing a DPSRAM.
Figure 32:
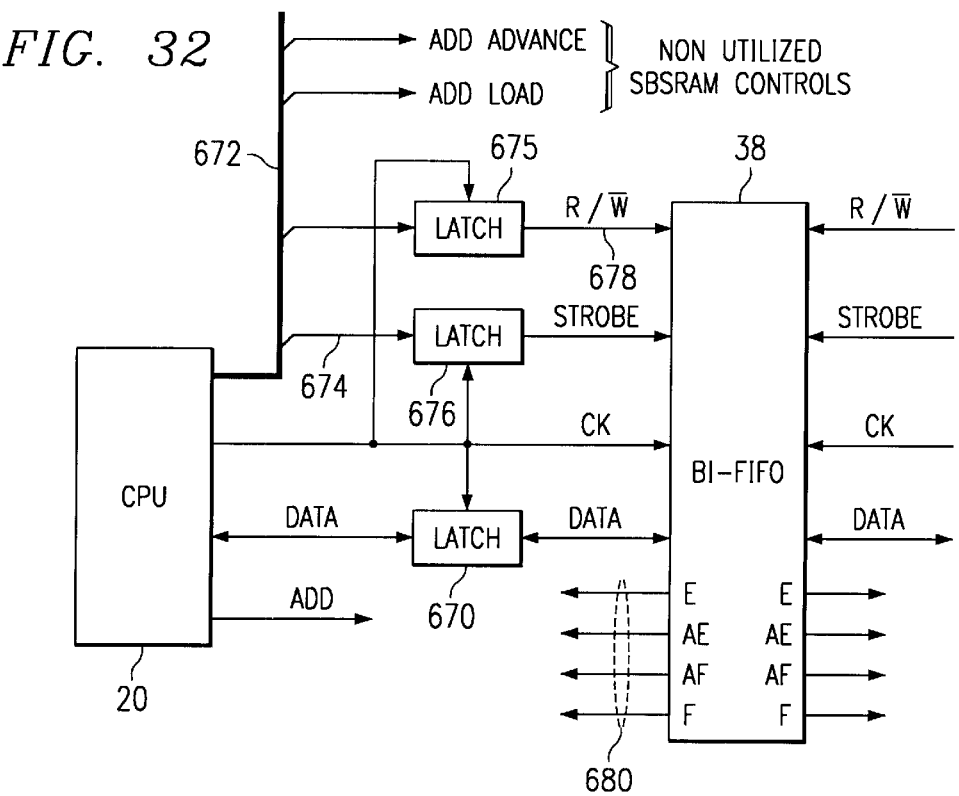
FIG. 32 illustrates a more detailed diagram of the translator circuit.

Referring now to FIG. 33, there is illustrated an alternate embodiment wherein a dual port SRAM (DPSRAM) 698 is provided in place of the Bi-FIFO 38. The DPSRAM 698 is a random access device. As such, it must have an address for accessing a particular memory location. This, of course, will require an associated translating device 700 for each side of the DPSRAM 698. Further, there will be required some type of mailbox function which is provided in the DPSRAM 698. This will allow a CPU 20 on one side of the DPSRAM 698 to communicate that information is stored in the DPSRAM 698 for retrieval therefrom by the CPU 20 on the other side of the DPSRAM 698.

In summary, there has been provided an intercommunication structure for communicating between processors in a multi-processor system. Each of the processors in the multi-processor system have the ability to communicate with a particular portion of the memory space in a predetermined format. A separate interface memory is provided which is disposed within that address space, but is accessible through a different format. A translator is provided between the CPU and the interface memory to convert or translate between the two formats for a Read and a Write operation. Some type of notification device is utilized to notify the CPU on the other side of the interface memory that data has been stored therein for retrieval thereby. This interface memory is a dual ported device and can facilitate random access storage or pipelined storage.

Although the preferred embodiment has been described in detail, it should be understood that various changes, substitutions and alterations can be made therein without departing from the spirit and scope of the invention as defined by the appended claims.

What is claimed is:

1. An interprocessor communication device for communicating between first and second processors, each having a communication protocol for transmitting data thereto and receiving data therefrom, comprising:

an interprocessor buffer for storing data, said buffer having a first communication port and a second communication port for communicating therewith in a third buffer communication protocol, wherein data can be transmitted into one of said first or second port for storage in said buffer and retrieved from the other of said first and second ports for access of data from said buffer;

a first translator for converting the communication protocol of the first processor to said third buffer communication protocol and disposed between the first processor and the first port of said buffer for allowing the first processor to communicate with said first port of said buffer in the associated communication protocol of the first processor; and a second translator for converting the communication protocol of the second processor to said third buffer communication protocol and disposed between the second processor and said second port of said buffer for allowing the second processor to communicate with said second port of said buffer in the associated communication protocol of the second processor.

2. The interprocessor communication device of claim 1 wherein the communication protocols for the first and second processors are the same communication protocol.

3. The interprocessor communication device of claim 1, wherein said interprocessor buffer is operable to store data received at one of said first and second ports by the associated one of the first and second processors until retrieved from the other of the first and second ports by the other of the first and second processors.

4. The interprocessor communication device of claim 1, wherein said interprocessor buffer can have data stored therein from one of said first and second ports and simultaneously have data retrieved from the other of said first and second ports.

5. The interprocessor communication device of claim 1, wherein the communication protocols of the first and second processors each comprises a memory access protocol for accessing a predetermined type of memory which has a predetermined access protocol, and wherein said first and second translators are operable to translate said memory access protocol associated with the first and second processors to said third buffer communication protocol such that communicating with said buffer by either of the first and second processors is effected by the first and second processors with said memory access protocol.

6. The interprocessor communication device of claim 5 and further comprising a notification device for notifying the one of the first and second processors to which data is being transmitted through said interprocessor buffer that data designated therefor is stored in said interprocessor buffer, and wherein said interprocessor buffer stores said data until retrieved by the receiving one of the first and second processors.

7. The interprocessor communication device of claim 6, wherein said notification device notifies the receiving one of the first and second processors notification in response to data being transferred to said interprocessor buffer by the transmitting one of the first and second processors.

8. The interprocessor communication device of claim 5, wherein said interprocessor buffer occupies a predetermined portion of the memory address space of the first and second processors.

9. The interprocessor communication device of claim 8, and further comprising:

a plurality of interprocessor buffers, each for storing data and each having a first port and a second port with an associated buffer communication protocol;

a multiplexing device for selecting only one of said plurality of buffers in response to a selection signal; and a selection device associated with each of the first and second processors for allowing the associated one of the first and second processors to control said associated selection device for selecting a desired one of said plurality of buffers for storing data therein.

10. An intercommunication network for multiprocessor system, comprising:

a global bus system having global resources associated therewith;

a plurality of processor nodes, each having a processor associated therewith;

a processor node interface associated with each of said processor nodes for interfacing between said global bus system and said associated processor node to allow said processor for each of said associated processor nodes to interface with the global resources on said global bus system; and an interprocessor communication device disposed between at least two of said processor nodes to allow said associated processor in said two of said processor nodes to transfer data therebetween without transfer of data through said is global bus system.

11. The intercommunication network for the multiprocessor system of claim 10, wherein said interprocessor communication device comprises a dual ported structure having a memory associated therewith with first and second ports, said first port associated with one of said processors for receiving data therefrom and transmitting data thereto, data transfer controlled by said associated processor, and said second port associated with another one of said processors for receiving data therefrom and transmitting data, data transfer controlled by said associated processor.

12. The intercommunication network for the multiprocessor system of claim 11, wherein said dual ported structure is operable to store data in said memory temporarily.

13. The intercommunication network for the multiprocessor system of claim 12, wherein said dual ported structure has associated therewith a notification device for notifying the receiving one of said processors that data has been transmitted to said memory in said dual ported structure for retrieval therefrom, retrieval of data effected by the receiving of said processors.

14. The intercommunication network for the multiprocessor system of claim 11, wherein said processor node has a local bus associated with said associated processor and having a local address space associated therewith and wherein said dual ported structure and said associated memory occupy a portion of said local address space.

15. The intercommunication network for the multiprocessor system of claim 14, wherein at least one of said processor nodes has two dual ported structures associated therewith for communicating with processors in two different and other processor nodes and wherein both of said dual ported structures associated therewith occupy the same portion of said associated local address space and further comprising a selection device for selecting between said two associated dual ported structures to allow said associated processor to communicate with the two different and other processor nodes and the processors associated therewith.

16. The intercommunication network for the multiprocessor system of claim 11, wherein each of said processors in each of said processor nodes has the ability to interface with a defined memory type different from the memory type of said memory in said dual ported structure and further comprising a translating device for translating between said defined memory type and the type of memory associated with said memory in said dual ported structure such that transfer of data to said dual ported structure is effected using an access protocol associated with said defined memory type.

17. The intercommunication network for the multiprocessor system of claim 11, wherein said memory is a pipelined memory structure in said dual ported structure.

18. The intercommunication network for the multiprocessor system of claim 10, wherein said interprocessor communication device allows communication between all of said processor nodes.

19. A method for communicating between first and second processors, each of the first and second processors having a communication protocol associated therewith for transmitting data and receiving data, comprising the steps of:

providing an interprocessor buffer operable to store data, the buffer having a first communication port and a second communication port for communication therewith in a third buffer protocol, wherein data can be transmitted into one of the first or second port for storage in the buffer and retrieved from other of the first and second ports for access of data from the buffer;

converting the communication protocol of the first processor to the third buffer protocol and then transferring data to the buffer from the first processor in a data Write operation, and converting the communication protocol from the third buffer protocol to the communication protocol of the first processor and then transferring data from the buffer to the first processor in a data Read operation;

converting the communication protocol of the second processor to the third buffer protocol and then transferring data to the buffer from the second processor in a data Write operation, and converting the communication protocol from the third buffer protocol to the communication protocol of the second processor and then transferring data from the buffer to the second processor in a data Read operation.

20. The method of claim 19, wherein the communication protocols for the first and second processors are the same communication protocol.

21. The method of claim 19, wherein the step of providing the interprocessor buffer comprises providing an interprocessor buffer that is operable to store data received at one of the first and second ports by the associated one of the first and second processors until retrieved from the other of the first and second ports by the other of the first and second processors.

22. The method of claim 19, wherein the communication protocols of the first and second processors each comprises a memory access protocol for accessing a predetermined type of memory which has a predetermined access protocol and wherein the steps of converting are each operable to provide a conversion between the memory access protocol for the associated one of the first and second processors and the third buffer protocol for both a data Read and a data Write operation.

23. The method of claim 22, and further comprising the step of notifying the one of the first and second processors to which data is being transmitted through the interprocessor buffer that data designated therefore is stored in the interprocessor buffer, and wherein the interprocessor buffer is operable to store the data until retrieved by the receiving one of the first and second processors.

24. A method for communicating between a plurality of processor nodes in a multiprocessor system, each of the processor nodes having a processor associated therewith, comprising the steps of:

providing a dual ported memory structure;

communicating between one of the processors in one of the processor nodes directly to one port of the dual ported memory structure, one of the dual ported memory structures associated with two of the processor nodes;

communicating with the other port of the dual ported memory structure with another processor in another one of the processor nodes, and transferring data from one of the processor nodes connected to one port of the dual ported memory structure to the other of the processor nodes associated with the other port of the dual ported memory structure by first storing data in the dual ported memory structure for access thereto or retrieval therefrom by the other processor and the other of the processor nodes.

* * * * *